US008775236B2

(12) United States Patent
Hedley et al.

(10) Patent No.: US 8,775,236 B2
(45) Date of Patent: *Jul. 8, 2014

(54) ELECTRONIC TOLL MANAGEMENT AND VEHICLE IDENTIFICATION

(71) Applicant: Accenture Global Services Limited, Dublin (IE)

(72) Inventors: Jay E. Hedley, Arlington, VA (US); Neal Patrick Thornburg, Charlotte, NC (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/907,133

(22) Filed: May 31, 2013

(65) Prior Publication Data

US 2013/0346165 A1    Dec. 26, 2013

Related U.S. Application Data

(63) Continuation of application No. 13/608,510, filed on Sep. 10, 2012, now Pat. No. 8,463,642, which is a continuation of application No. 13/113,125, filed on May 23, 2011, now Pat. No. 8,265,988, which is a continuation of application No. 11/423,683, filed on Jun. 12, 2006, now Pat. No. 7,970,644, which is a continuation-in-part of application No. 10/371,549, filed on Feb. 21, 2003, now abandoned.

(60) Provisional application No. 60/689,050, filed on Jun. 10, 2005.

(51) Int. Cl.
G07B 15/00 (2011.01)
G07B 15/02 (2011.01)
G08G 1/017 (2006.01)

(52) U.S. Cl.
CPC .................................. *G08G 1/017* (2013.01)

USPC .............. 705/13; 340/928; 340/988; 382/105

(58) Field of Classification Search
CPC .............................. G08G 1/017; G07B 15/063
USPC ...................... 705/13; 340/928, 937; 235/375
See application file for complete search history.

(56) References Cited

U.S. PATENT DOCUMENTS 4,242,661 A    12/1980  Henoch et al.
4,963,723 A    10/1990  Masada
(Continued)

FOREIGN PATENT DOCUMENTS

CA    2163872 A1    12/1994
CA    2302277 A1    2/1999
(Continued)

OTHER PUBLICATIONS

Tetsusaki, High security electronic toll and traffic management and road pricing system using encrypted messages and personal identity number, Vehicle Navigation and Information Systems Conference Proceedings, IEEE, 1994, pp. 695-698.

(Continued)

*Primary Examiner* — Brian Epstein
(74) *Attorney, Agent, or Firm* — Fish & Richardson P.C.

(57) ABSTRACT

Identifying a vehicle in a toll system includes accessing image data for a first vehicle and obtaining first vehicle identifier data from the accessed image data for the first vehicle. A set of records is accessed. Each record includes first vehicle identifier data for a vehicle. The first vehicle identifier data for the first vehicle is compared with the first vehicle identifier data for vehicles in the set of records. Based on the results of the comparison of the first vehicle identifier data, a set of vehicles is identified from the vehicles having records in the set of records. Second vehicle identifier data is accessed for the first vehicle and is compared to second vehicle identifier data for the set of vehicles in order to identify the first vehicle.

18 Claims, 11 Drawing Sheets

(56) References Cited

U.S. PATENT DOCUMENTS

| | | | |
|---|---|---|---|
| 5,349,674 A | 9/1994 | Calvert et al. | |
| 5,392,034 A | 2/1995 | Kuwagaki | |
| 5,638,302 A | 6/1997 | Gerber | |
| 5,740,230 A | 4/1998 | Vaudreuil | |
| 5,745,052 A | 4/1998 | Matsuyama et al. | |
| 5,770,841 A * | 6/1998 | Moed et al. | 235/375 |
| 5,819,234 A | 10/1998 | Slavin et al. | |
| 5,920,338 A | 7/1999 | Katz | |
| 6,042,008 A | 3/2000 | Ando et al. | |
| 6,052,068 A | 4/2000 | Price et al. | |
| 6,064,318 A | 5/2000 | Kirchner et al. | |
| 6,081,206 A | 6/2000 | Kielland | |
| 6,121,898 A | 9/2000 | Moetteli | |
| 6,140,941 A * | 10/2000 | Dwyer et al. | 340/928 |
| 6,167,333 A | 12/2000 | Gehlot | |
| 6,374,240 B1 * | 4/2002 | Walker et al. | 705/15 |
| 6,433,706 B1 * | 8/2002 | Anderson et al. | 340/937 |
| 6,473,517 B1 * | 10/2002 | Tyan et al. | 382/105 |
| 6,476,715 B1 * | 11/2002 | Bromer | 340/468 |
| 6,538,580 B2 * | 3/2003 | Bostrom et al. | 340/933 |
| 6,747,687 B1 * | 6/2004 | Alves | 348/148 |
| 6,892,942 B1 | 5/2005 | Widl et al. | |
| 6,922,156 B2 * | 7/2005 | Kavner | 340/988 |
| 6,959,869 B2 * | 11/2005 | Tsikos et al. | 235/462.01 |
| 6,966,489 B2 | 11/2005 | Grant | |
| 6,999,886 B2 | 2/2006 | Hilliard | |
| 7,119,674 B2 | 10/2006 | Sefton | |
| 7,215,833 B1 | 5/2007 | Tepera et al. | |
| 7,232,064 B1 | 6/2007 | Toohey | |
| 7,407,097 B2 | 8/2008 | Robinson et al. | |
| 7,941,378 B2 * | 5/2011 | Carpenter et al. | 705/62 |
| 2001/0026228 A1 | 10/2001 | Naito | |
| 2002/0072963 A1 | 6/2002 | Jonge | |
| 2002/0097178 A1 | 7/2002 | Thomas et al. | |
| 2002/0105440 A1 * | 8/2002 | Bostrom et al. | 340/928 |
| 2002/0140577 A1 | 10/2002 | Kavner | |
| 2002/0140579 A1 * | 10/2002 | Kavner | 340/988 |
| 2002/0140924 A1 | 10/2002 | Wangler et al. | |
| 2002/0141618 A1 | 10/2002 | Ciolli et al. | |
| 2002/0198641 A1 | 12/2002 | Halle | |
| 2002/0198767 A1 | 12/2002 | Kim | |
| 2003/0011492 A1 | 1/2003 | Owen et al. | |
| 2003/0042304 A1 | 3/2003 | Knowles et al. | |
| 2003/0067396 A1 | 4/2003 | Hassett | |
| 2003/0189500 A1 | 10/2003 | Lim | |
| 2004/0008368 A1 | 1/2004 | Plunkett et al. | |
| 2004/0008514 A1 | 1/2004 | Lee et al. | |
| 2004/0095258 A1 * | 5/2004 | Bosch et al. | 340/937 |
| 2004/0167861 A1 | 8/2004 | Hedley | |
| 2004/0174272 A1 | 9/2004 | Lin | |
| 2004/0181495 A1 | 9/2004 | Grush | |
| 2004/0233036 A1 | 11/2004 | Sefton | |
| 2005/0084134 A1 * | 4/2005 | Toda | 382/105 |
| 2005/0144156 A1 * | 6/2005 | Barber | 707/3 |
| 2005/0197976 A1 | 9/2005 | Tuton et al. | |
| 2006/0050932 A1 * | 3/2006 | Tumey et al. | 382/116 |
| 2006/0056658 A1 * | 3/2006 | Kavner | 382/105 |
| 2006/0064345 A1 | 3/2006 | Biet | |
| 2006/0080266 A1 * | 4/2006 | Kiani et al. | 705/402 |
| 2006/0164258 A1 | 7/2006 | Garibotto et al. | |
| 2006/0232442 A1 * | 10/2006 | Vastad et al. | 340/932.2 |
| 2006/0258367 A1 | 11/2006 | Chiang | |
| 2007/0124198 A1 | 5/2007 | Robinson et al. | |
| 2007/0252678 A1 | 11/2007 | Garcia et al. | |
| 2007/0299721 A1 | 12/2007 | Robinson et al. | |
| 2008/0218383 A1 * | 9/2008 | Franklin et al. | 340/937 |
| 2008/0231470 A1 * | 9/2008 | Ioli | 340/932.2 |

FOREIGN PATENT DOCUMENTS

| | | |
|---|---|---|
| CA | 2422187 A1 | 3/2002 |
| DE | 10104502 A1 | 8/2002 |
| GB | 2344205 A | 5/2000 |
| JP | 2004213569 A | 7/2004 |
| WO | WO9814925 A1 | 4/1998 |
| WO | WO9966455 A2 | 12/1999 |
| WO | WO0046068 A1 | 8/2000 |
| WO | WO02063570 A2 | 8/2002 |
| WO | WO03003314 A1 | 1/2003 |
| WO | WO2004042673 A2 | 5/2004 |
| WO | WO2004075121 A1 | 9/2004 |
| WO | WO2007030446 A2 | 3/2007 |

OTHER PUBLICATIONS

Levinson, et al., A model for optimizing electronic toll collection systems, Transportation Research Part A: Policy and Practice 37.4, 2003, pp. 293-314.

Zarrillo, et al., Modeling traffic operations at electronic toll collection and traffic management systems, Computers & Industrial Engineering vol. 33, Iss. 3-4, Dec. 1997, pp. 857-860.

Australian Patent Office Examination Report of Application No. SG200718365-1 dated Apr. 7, 2010, 6 pages.

Australian Patent Office Examiner's Report No. 2 of Application No. 2006257287 dated Mar. 28, 2012, 2 pages.

Canadian Office Action of Application No. 2,516,675, dated Jun. 19, 2008, 4 pages.

Canadian Office Action of Application No. 2,516,675, dated Mar. 31, 2009, 6 pages.

China Office Action of Application No. 200680027002.3 dated Jun. 26, 2009, 10 pages.

European Office Action in Application No. 0608926.7, dated Mar. 23, 2010, 6 pages.

Australian Examiner's first report on Australian patent application No. 2004213923.

India First Examination Report for Indian Ref No. 2348/CHENP/2005-CAN dated Jul. 25, 2006.

Hultgren, L. et al., "San Diego's interstate 15 high-occupancy/toll lane facility using value pricing", Institute of Transportation Engineers. ITE Journal, Jun. 1999, vol. 69, issue 6; p. 22, 6 pgs, 18 pages.

International Preliminary Examination Report and Written Opinion for International Application No. PCT/EP2004/001644 dated Sep. 14, 2005.

International Search and Written Opinion, PCT/IB2006/002738, dated Mar. 12, 2007, 11 pages.

International Search Report and Written Opinion for International Application No. PCT IB2006/002435.

McLeod, J., "Automatic highways going the right way?", Electronics, Nov. 28, 1994, 67, 22, 1 page.

"Perle and MFS Network Technologies Partner to Provide Connectivity for New Jersey Toll Road Consortium E-ZPass Project", Business Wire, Jan. 17, 2000.

Republic of China Office Action of Application No. 200480010404.3 dated Aug. 1, 2008, 27 pages.

Search Report and Written Opinion of Application No. SG200718336-1 dated Sep. 4, 2009, 8 pages.

Search Report and Written Opinion of Application No. SG200718365-0 dated Jul. 23, 2009, 9 pages.

Smith, L. Intelligent Transportation Systems—Electronic Toll Collection [online], Jan. 3, 2002 [retrieved on Jul. 7, 2011]. Retrieved from the Internet<URL: http://www.calccit.org/itsdecision/serv_and_tech/Electronic_toll_collection/electronic_toll_collection_rep_print.html >.

Australian Patent Office Examiner's First Report on Application No. 2006257287 dated Mar. 3, 2011, 3 pages.

"Life as a moving violation" from the website http://prorev.com/dcmoving.htm, section December Brian Debose, Washington Times, p. 3.

China First Office Action for Application No. 201010214910.1 dated May 12, 2011, 13 pages.

European Patent Office Search Report for Application No. 12161598.3-1229 dated May 23, 2012, 5 pages.

U.S. Notice of Allowance for U.S. Appl. No. 13/608,510 dated Feb. 13, 2013, 25 pages.

Canadian Office Action for Application No. 2611379 dated Apr. 2, 2014, 5 pages.

* cited by examiner

ELECTRONIC TOLL MANAGEMENT AND VEHICLE IDENTIFICATION

CROSS-REFERENCE TO RELATED APPLICATIONS

This application is a continuation (and claims the benefit of priority under 35 USC 120) of U.S. application Ser. No. 13/608,510, filed on Sep. 10, 2012, now allowed, which is a continuation of U.S. application Ser. No. 13/113,125, filed on May 23, 2011, now U.S. Pat. No. 8,265,988, issued Sep. 11, 2012, which is a continuation of U.S. application Ser. No. 11/423,683, filed on Jun. 12, 2006, now U.S. Pat. No. 7,970,644, issued Jun. 28, 2011, which claims priority to U.S. Provisional Application Ser. No. 60/689,050, filed on Jun. 10, 2005 and which is also a continuation-in-part of U.S. application Ser. No. 10/371,549, filed Feb. 21, 2003, now abandoned. The disclosures of the prior applications are considered part of (and are incorporated by reference in) the disclosure of this application.

TECHNICAL FIELD

This document relates to electronic toll management.

BACKGROUND

Transportation facilities such as roads, bridges, and tunnels produce tolls often representing a major source of income for many states and municipalities. The large number of automobiles, trucks, and buses stopping at tollbooths to pay a toll daily can cause significant problems. For example, such facilities may restrict the flow of traffic causing traffic backups and lane changing, often increasing the likelihood of accidents and even more bottlenecks. In addition, many people may be delayed from reaching their destinations, and goods may be delayed from getting to market and millions of gallons of fuel may be wasted as vehicles idle. Environments may experience an increase in pollution as idling and slow moving vehicles emit pollutants (particularly carbon dioxide and carbon monoxide), which may pose a significant health hazard to motorists as well as to tollbooth operators.

Some tollbooth systems may have a program requiring that a motorist rent and then attach to the windshield of the vehicle a radio transponder that communicates via radio frequency with receiver units at tollbooth plazas. However, such programs require drivers to seek out the program and to register for the program. These programs may make it mandatory for a motorist to make a credit card deposit and create an automatic debit account arrangement, which may effectively eliminate drivers with credit problems. These programs also may bill participants based on a minimum amount of travel regardless of the actual amount of travel. Thus, many motorists who travel infrequently travel through the toll road may receive little benefit after investing time and money to participate in the program.

SUMMARY

The present disclosure describes at least one toll system that enables automatic and electronic handling of payment of tolls by vehicles passing a toll facility, without requiring the vehicles to slow down or to have a transponder. Such a system automatically identifies all or substantially all of the vehicles that pass the toll facility, and bills the owner of each identified vehicle for the incurred toll fee. Unfortunately, due to the high number of vehicles that pass through a typical toll facility, known vehicle identification techniques (e.g., license plate reading (LPR)) typically have too high of an error rate for effective use in this system. For example, the error rate for a typical LPR system may be approximately 1%. While such an error rate may be acceptable for toll systems that only identify vehicles that are violators, this error rate is typically too high for a toll system that attempts to identify every passing vehicle, not just the violators, for collection of toll fees. In such a system, a 1% error rate can result in a significant loss of revenue (e.g., the loss of 1000 or more toll fees a day).

Additionally, typical LPR systems often exhibit a tradeoff between the number of vehicles identified (i.e., those vehicles for which the read result exceeds a read confidence threshold for presumption of correct ID) and the error rate. In an ideal world, this tradeoff would be reflected in a binary confidence continuum, where the system always produces a read confidence level of one when the read result is correct and a read confidence level of zero when the read result is incorrect. In reality, however, the read results are usually at least partially correct, and the system generates a confidence continuum having a broad range of confidence levels ranging, for example, from a level of one or near one (very likely correct) to a level of zero or near zero (very likely incorrect). The system, therefore, is often required to set an arbitrary read confidence threshold for determining which read results will be deemed correct. Once the read confidence threshold is set, any read results having confidence levels above the threshold are deemed correct and any read results having confidence levels below the threshold are deemed incorrect. Setting the read confidence threshold too high (e.g., at 0.95 or higher) significantly decreases the possibility of an error but also excludes many correct read results, thereby reducing revenue. Conversely, setting the read confidence threshold too low (e.g., 0.3 or higher) increases the number of reads deemed correct but also significantly increases the number of errors, thereby increasing costs by introducing errors into a large number of accounts/bills which require much time and effort to audit and correct. In a toll system that identifies every passing vehicle, this tradeoff is particularly problematic since it may result in a significant loss of profits.

Moreover, a toll system that identifies every passing vehicle is identifying a much larger number of vehicles than a conventional toll system, which typically only identifies violators. Accordingly, such a toll system attempts to identify every passing vehicle and is designed to both maximize revenue by identifying vehicles very accurately and limit personnel costs by minimizing the need for manual identification of vehicles and account/bill error processing.

In one particular implementation, to obtain a lower vehicle identification error rate (and obtain a higher automated identification rate), the toll system uses two vehicle identifiers to identify a target vehicle. Specifically, the toll system collects image and/or sensor data for the target vehicle and extracts two vehicle identifiers from the collected data. The vehicle identifiers extracted from the collected data may include, for example, license plate information, a vehicle fingerprint, a laser signature, and an inductive signature for the target vehicle. In one particular implementation, the first vehicle identifier is license plate information and the second vehicle identifier is a vehicle fingerprint.

The toll system uses the first vehicle identifier to determine a set of one or more matching vehicle candidates by searching a vehicle record database and including in the set only those vehicles associated with records having data that match or nearly match the first vehicle identifier of the target vehicle.

The toll system uses the second vehicle identifier of the target vehicle to identify the target vehicle from among the set of matching vehicle candidates.

When the first vehicle identifier is license plate information and the second vehicle identifier is a vehicle fingerprint, the toll system may eliminate the problematic trade-off between the number of vehicles identified and the error rate typical of LPR systems by using the LPR identification for identification of the group of vehicle candidates, rather than for the final identification of the vehicle, and then using the much more accurate vehicle fingerprint matching for the final identification of the vehicle. Thus, incorrect reads by the LPR system are eliminated during the final and more accurate fingerprint matching identification. This toll system may thereby be able to obtain extremely accurate identification results for a larger proportion of vehicles than would be obtained through license plate reading alone.

In particular, the toll system accesses the records of the matching vehicle candidates and searches for one or more records that have data sufficiently similar to the second vehicle identifier of the target vehicle so as to indicate a possible match. If no possible matches are found for the target vehicle among the set of matching vehicle candidates, the toll system may increase the size of the set by changing the matching criteria and may once again attempt to identify one or more possible matches for the target vehicle from among the larger set of matching vehicle candidates. If still no possible matches are found, the toll system may enable a user to manually identify the target vehicle by providing the user with access to the collected data for the target vehicle and access to databases internal and/or external to the toll system.

If one or more possible matches are found, a confidence level is determined for each possible match. If the confidence level of a possible match surpasses an automated confidence threshold, the toll system automatically identifies the target vehicle without human intervention as the vehicle corresponding to the possible match. If the confidence level of a possible match surpasses a probable match threshold, the toll system presents the probable match to a human operator and enables the human operator to confirm or reject the probable match. If no automatic match or confirmed probable match is found, the toll system enables a user to manually identify the target vehicle by providing the user with access to the collected data for the target vehicle and the possible matches identified by the toll system, and with access to databases internal and/or external to the toll system.

In this manner, the toll system typically obtains greater vehicle identification accuracy by requiring that two vehicle identifiers be successfully matched for successful vehicle identification. Moreover, the identification process may be faster because the matching of the second identifier is limited to only those vehicle candidates having records that successfully match the first vehicle identifier. Human operator intervention is also kept to a minimum through use of multiple confidence level thresholds.

In one general aspect, identifying a vehicle in a toll system includes accessing image data for a first vehicle and obtaining license plate data from the accessed image data for the first vehicle. A set of records is accessed. Each record includes license plate data for a vehicle. The license plate data for the first vehicle is compared with the license plate data for vehicles in the set of records. Based on the results of the comparison of the license plate data, a set of vehicles is identified from the vehicles having records in the set of records. Vehicle fingerprint data is accessed for the first vehicle. The vehicle fingerprint data for the first vehicle is based on the image data for the first vehicle. Vehicle fingerprint data for a vehicle in the set of vehicles is accessed. Using a processing device, the vehicle fingerprint data for the first vehicle is compared with the vehicle fingerprint data for the vehicle in the set of vehicles. The vehicle in the set of vehicles is identified as the first vehicle based on results of the comparison of vehicle fingerprint data.

Implementations may include one or more of the following features. For example, comparing license plate data for the first vehicle with license plate data for vehicles in the set of records may include searching a vehicle record database for records that include license plate data that exactly match the license plate data obtained for the first vehicle. Comparing license plate data for the first vehicle may further include performing an extended search of the vehicle record database for records that include license plate data that nearly match the license plate data obtained for the first vehicle. The extended search may be conditioned on no vehicle identification records being found that include license plate data that exactly match the license plate data obtained for the first vehicle.

Comparing the license plate data for the first vehicle with the license plate data for vehicles in the set of records may include comparing the license plate data using predetermined matching criteria. The predetermined matching criteria may be changed to increase the number of vehicles in the identified set of vehicles. Changing the predetermined matching criteria to increase the number of vehicles in the identified set of vehicles may be conditioned on a failure to identify any vehicles in the set of vehicles as the first vehicle based on results of the comparison of vehicle fingerprint data.

Identifying a vehicle in a toll system may further include capturing laser signature data or inductive signature data for the first vehicle. The laser signature data may include data obtained by using a laser to scan the first vehicle. The laser signature data may include one or more of an overhead electronic profile of the first vehicle, an axle count of the first vehicle, and a 3D image of the first vehicle.

The inductive signature data may include data obtained through use of a loop array over which the first vehicle passes. The inductive signature data may include one or more of an axle count of the first vehicle, a type of engine of the first vehicle, and a vehicle type or class for the first vehicle.

Each record in the set of records includes laser signature data or inductive signature data for a vehicle. Identifying a vehicle in a toll system may further include comparing laser signature data or inductive signature data for the first vehicle with laser signature data or inductive signature data for vehicles in the set of records. Identifying a set of vehicles from the vehicles having records in the set of records may include identifying the set of vehicles based on the results of the comparison of the license plate data and the results of the comparison of the laser signature data or the inductive signature data.

Identifying the set of vehicles based on the results of the comparison of license plate data and the results of the comparison of the laser signature data or inductive signature data may include determining a combined equivalent matching score for each vehicle having a record in the set of records and identifying the set of vehicles as a set of vehicles having combined equivalent matching scores above a predetermined threshold. Each combined equivalent matching score may include a weighted combination of a laser or inductive signature matching score and a license plate matching score.

Identifying the vehicle in the set of vehicles as the first vehicle may include identifying the vehicle as the first vehicle based on the results of the comparison of the vehicle fingerprint data and the results of the comparison of the laser signature data or inductive signature data. Identifying the vehicle in the set of vehicles as the first vehicle based on the results of the comparison of the vehicle fingerprint data and the results of the comparison of the laser signature data or inductive signature data may include determining a combined equivalent matching score for the vehicle in the set of vehicles and determining that the combined equivalent matching score is above a predetermined threshold. The combined equivalent matching score may include a weighted combination of a laser or inductive signature matching score and a vehicle fingerprint matching score.

Identifying the vehicle in the set of vehicles as the first vehicle may include identifying the vehicle as the first vehicle if the comparison of the vehicle fingerprint data for the first vehicle with the vehicle fingerprint data for the vehicle in the set of vehicles indicates a match having a confidence level that exceeds a confidence threshold. Identifying the vehicle in the set of vehicles as the first vehicle may include identifying the vehicle as the first vehicle without human intervention if the confidence level of the match exceeds a first confidence threshold and/or may include identifying the vehicle as the first vehicle if the confidence level of the match is less than the first confidence level but greater than a second confidence threshold and a human operator confirms the match. The human operator may confirm or reject the match by enabling the operator to perceive the image data for the first vehicle and enabling the human operator to interact with a user interface to indicate rejection or confirmation of the match.

Identifying the vehicle in the set of vehicles as the first vehicle may include identifying the vehicle as the first vehicle if the confidence level of the match is less than the first and second confidence thresholds and a human operator manually identifies the vehicle as the first vehicle by accessing the image data for the first vehicle and the record for the vehicle in the set of records. The human operator may manually identify the vehicle in the set of vehicles as the first vehicle by enabling the human operator to access the image data for the first vehicle, enabling the human operator to access the record for the vehicle in the set of records, and enabling the human operator to interact with a user interface to indicate positive identification of the first vehicle as the vehicle in the set of vehicles. The human operator may be enabled to manually identify the vehicle in the set of vehicles as the first vehicle by enabling the human operator to access data stored in databases of external systems.

Identifying the vehicle in the set of vehicles as the first vehicle may include identifying the vehicle by combining vehicle identification number (VIN), laser signature, inductive signature, and image data.

In another general aspect, an apparatus for identifying a vehicle in a toll system includes an image capture device configured to capture image data for a first vehicle. The apparatus further includes one or more processing devices communicatively coupled to each other and to the image capture device. The one or more processing devices are configured to obtain license plate data from the captured image data for the first vehicle and access a set of records. Each record in the set of records includes license plate data for a vehicle. The one or more processing devices are further configured to compare the license plate data for the first vehicle with the license plate data for vehicles in the set of records and identify a set of vehicles from the vehicles having records in the set of records. The set of vehicles is identified based on results of the comparison of the license plate data. The one or more processing devices are further configured to access vehicle fingerprint data for the first vehicle. The vehicle fingerprint data for the first vehicle is based on the captured image data for the first vehicle. The one or more processing devices are also configured to access vehicle fingerprint data for a vehicle in the set of vehicles, compare the vehicle fingerprint data for the first vehicle with the vehicle fingerprint data for the vehicle in the set of vehicles, and identify the vehicle in the set of vehicles as the first vehicle based on results of the comparison of vehicle fingerprint data.

In another general aspect, identifying a vehicle in a toll system includes accessing image or sensor data for a target vehicle and extracting a first identifier and a second identifier from the image or sensor data. The extracted first identifier is used to identify a set of one or more vehicle candidates as potential matches for the target vehicle. The extracted second identifier is used to identify the target vehicle as a vehicle selected from the set of one or more vehicle candidates.

The above and other implementations and features are described in detail below.

BRIEF DESCRIPTION OF THE DRAWINGS

Like reference symbols in the various drawings indicate like elements.

DETAILED DESCRIPTION

Figure 1:
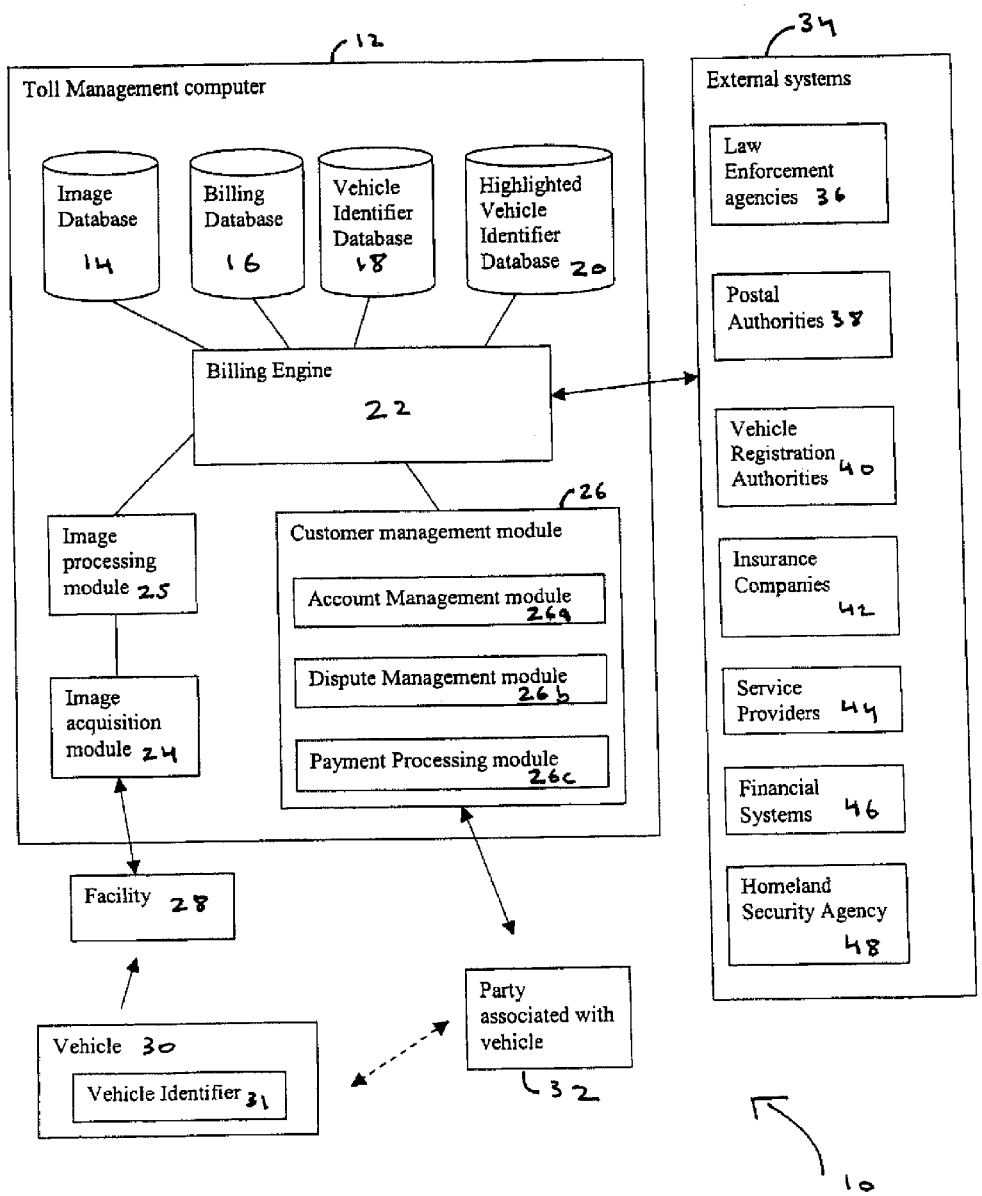
FIG. 1 is a block diagram of an implementation of an electronic toll management system.

FIG. 1 is a block diagram of an implementation of an electronic toll management system 10. The system 10 is configured to capture a vehicle identifier 31 of vehicle 30 interacting with a facility 28 and to notify external systems 34 of such interaction. For example, the system 10 may allow a toll road authority to capture a vehicle identifier 31, such as license plate information, from a vehicle 30 traveling through the toll road and then to notify law enforcement whether the captured vehicle identifier matches a license plate previously highlighted by law enforcement.

The toll management system 10 also can manage payment from a party associated with the vehicle 32 based on the interaction between the vehicle 30 and the facility 28. For example, the system 10 can capture license plate information from a vehicle 30 and identify the registered owner of the vehicle. The system would then provide to the owner, over a communications channel such as the Internet, an account for making payment or disputing payment. The toll management system 10 can send a bill requesting payment from the party 32 using a mailing address that has been verified against one or more mailing address sources. The system 10 is capable of automatically capturing an image of the vehicle 30 triggered by the vehicle interacting with the facility. Such image capturing can be accomplished using image-processing technology without having to install a radio transponder (e.g., RFID device) in a vehicle.

The electronic toll management system 10 includes a toll management computer 12 which can be configured in a distributed or a centralized manner. Although one computer 12 is shown, one or more computers can be configured to implement the disclosed techniques. The computer 12 is coupled to a facility 28 that may charge a fee for interacting with the facility. Examples of a facility 28 include a toll facility (managed by toll authorities) such as toll road, a toll bridge, a tunnel, parking facility, or other facility. The fee may be based on the interaction between the vehicle 30 and the facility 28. Examples of interactions that may involve a fee include a distance traveled by the vehicle through the facility, a time period the vehicle is present in a facility, the type of vehicle interacting with the facility, the speed at which the vehicle passes through the facility, and the type of interaction between the vehicle and the facility.

The facility 28 can process vehicles including automobiles, a truck, buses, or other vehicles. For ease of explanation, the system 10 shows a single facility 28 interacting with a single vehicle 30 and a party associated with the vehicle 32. However, in other implementations, the disclosed techniques could be configured to operate with one or more vehicles interacting with one or more facilities spanning different geographic locations.

The toll management computer 12 includes an image acquisition module 24 configured to detect the presence of a vehicle, acquire one or more images of the vehicle, and forward the image(s) to an image-processing module 25 for further processing. The module 24 may include image acquisition equipment based on the physical environment in which it is used.

For example, for open-road applications, image acquisition equipment may be mounted above the roadway, on existing structures or on purpose-built gantries. Some open-road applications may use equipment mounted in or beside the roadway as well. Lane-based (or tollbooth-style) applications may use equipment mounted on physical structures beside each lane, instead of or in addition to equipment mounted overhead or in the roadway.

The image acquisition module 24 may include imaging components such as vehicle sensors, cameras, digitizing systems, or other components. Vehicle sensors can detect the presence of a vehicle and provide a signal that triggers a camera to capture one or more images of the vehicle. Vehicle sensors may include one or more of the following:

(1) Laser/sonic/microwave devices—these devices, commonly used in Intelligent Transportation Systems (ITS) applications, can recognize the presence of a vehicle and provide information regarding the vehicle's size, classification, and/or speed. These sensors may be configured to provide additional information about the vehicle which can be used in identify the vehicle and its use of the toll facility, including trip time and compliance with traffic laws.

(2) Loops—these sensors can detect the presence and the vehicle type by recognizing the presence of metal masses using a wire loop embedded in the road. Loops can be used as a backup to more sophisticated sensors. Loops can also be used as a primary source of data to detect vehicles, classify vehicles, trigger cameras, and provide vehicle signature data (e.g., based on use of an array of loops with a smart loop control program such as Diamond Consulting's IDRIS® system of Buckinghamshire, United Kingdom).

(3) Through-beam sensors—these sensors may emit a continuous beam across the roadway, and detect the presence of a vehicle based upon interruptions in the beam. This type of sensor may be used in installations where traffic is channeled into tollbooth-style lanes.

(4) Optical sensors—vehicle may be recognized using cameras to continuously monitor images of the roadway for changes indicating the presence of a vehicle. These cameras also can be used to record images for vehicle identification.

Cameras can be used to capture images of vehicles and their identifying characteristics. For example, they can be used to generate a vehicle identifier such as a vehicle license number based on an image of a license plate. Cameras may be analog or digital, and may capture one or more images of each vehicle.

Digitizing systems convert images into digital form. If analog cameras are used, the cameras can be connected to separate digitizing hardware. This hardware may include a dedicated processing device for analog-to-digital conversion or may be based on an input device installed in a general-purpose computer, which may perform additional functions such as image processing. Lighting can be employed to provide adequate and consistent conditions for image acquisition. The lighting may include strobes or continuous illumination, and may emit light of light in the visible spectrum or in the infrared spectrum. If strobes are used, they may be triggered by inputs from the vehicle sensor(s). Other sensors such as light sensors may be required to control the image acquisition module 24 and provide consistent results.

Once the image acquisition module 24 has captured images of the vehicles, the images may be forwarded to an image-processing module 25. The image-processing module 25 may be located in the same location as the image acquisition module 24 and the image computer 12, in a remote location, or a combination of these locations. The module 25 can process a single image for each vehicle or multiple images of each vehicle, depending on the functionality of the image acquisition module 24 and/or business requirements (e.g., accuracy, jurisdictional requirements). If multiple images are used, each image may be processed, and the results may be compared or combined to enhance the accuracy of the process. For example, more than one image of a rear license plate, or images of both front and rear license plates, may be processed and the results compared to determine the most likely registration number and/or confidence level. Image processing may include identifying the distinguishing features of a vehicle (e.g., the license plate of a vehicle) within the image, and analyzing those features. Analysis may include optical character recognition (OCR), template matching, or other analysis techniques.

The toll management system 10 may include other systems capable of substantially real-time processing located at the site where images are acquired to reduce data communication requirements. In an implementation of local image processing, the results may be compared to a list of authorized vehicles. If a vehicle is recognized as authorized, images and/or data may be discarded rather than forwarded for further processing.

Images and data can be forwarded to a central processing facility such as the image database 14 operating in conjunction with the billing engine 22. This process may involve a computer network, but may also include physical media from another computer located at the image acquisition site (i.e., facility 28). Generally, information can be temporarily stored on a computer at the image acquisition site in the event the network is unavailable.

Images received at the central site may not have been processed. Any unprocessed images can be handled as described above. The data resulting from image processing (remote or central) may be separated into two categories. Data that meets application-specific or jurisdiction-specific criteria for confidence may be sent directly to the billing engine 22. On the other hand, data results not meeting required confidence levels may be flagged for additional processing. Additional processing may include, for example, determining whether multiple images of a vehicle are available and independently processing the images and comparing the results. This may include character-by-character comparisons of the results of optical character recognition (OCR) on the license plate image. In another example, the image(s) may be processed by one or more specialized algorithms for recognizing license plates of certain types or styles (such as plates from a particular jurisdiction). These algorithms may consider the validity of characters for each position on the license plate, the anticipated effect of certain design features (such as background images), or other style-specific criteria. The processed image may be forwarded based on preliminary processing results, or may include processing by all available algorithms to determine the highest confidence level.

Preliminary data may be compared to other data available to increase the confidence level. Such techniques include:

(1) Comparing OCR processed license plate data against lists of valid license plate numbers within the billing system or at the appropriate jurisdiction's motor vehicle registration authority.

(2) Comparing other data obtained from sensors at the imaging location (such as vehicle size) to known characteristics of the vehicle registered under the registration number recognized by the system, in the recognized jurisdiction or in multiple jurisdictions.

(3) Comparing the registration and other data to records from other sites (e.g., records of the same or similar vehicle using other facilities on the same day, or using the same facility at other times).

(4) Comparing vehicle fingerprint data against stored lists of vehicle fingerprint data. The use of vehicle fingerprint data for vehicle identification is described in more detail below.

(5) Manually viewing the images or data to confirm or override the results of automated processing.

If additional processing provides a result with a particular confidence level, the resulting data then can be forwarded to the billing engine 22. If the required confidence level cannot be attained, the data may be kept for future reference or discarded.

The billing engine 22 processes the information captured during the interaction between the vehicle and the toll facility, including the vehicle identifier as determined by the image processing module 25 to create a transaction event corresponding to an interaction between the vehicle and the facility. The engine 22 can store the transaction event in a billing database 16 for subsequent payment processing. For example, the billing engine 22, alone or in combination with a customer management module 26 (described below), produces payment requests based on the transaction events. The transaction event data may include individual charges based on a vehicle's presence at specific points or facilities, or trip charges based on a vehicle's origin and destination involving a facility. These transaction events can be compiled and billed, for example, by one or more of the following methods:

(1) Deducting payment from an account established by the vehicle owner or operator. For example, the billing database 20 can be used to store an account record for each vehicle owner. In turn, each account record can include a reference to one more transaction events. A paper or electronic payment statement may be issued and sent to the registered owner of the vehicle.

(2) Generating a paper bill and sending it to the owner of the vehicle using a mailing address derived from a vehicle registration record.

(3) Presenting an electronic bill to a predefined account for the vehicle owner, hosted either by the computer 12 or a third party.

(4) Submitting a bill to the appropriate vehicle registration authority or tax authority, permitting payment to be collected during the vehicle registration renewal process or during the tax collection process.

Billing may occur at regular intervals, or when transactions meet a certain threshold, such as maximum interval of time or maximum dollar amount of outstanding toll charges and other fees. Owners may be able to aggregate billing for multiple vehicles by establishing an account with the computer 12.

The customer management module 26 can allow a user to interact with the toll management computer 12 over a communications channel such as a computer network (e.g., Internet, wired, wireless, etc.), a telephone connection, or other channel. The user can include a party associated with a vehicle 22 (e.g., owner of the vehicle), a public or private authority responsible for management of the facility 28, or other user. The customer management module 26 includes a combination of hardware and software module configured to handle customer interactions such as an account management module 26a, a dispute management module 26b and a payment processing module 26c. The module 26 employs secure access techniques such as encryption, firewalls, password or other techniques.

The account management module 26a allows users such as motorists to create an account with the system 10, associate multiple vehicles with that account, view transactions for the account, view images associated with those transactions, and make payments on the account. In one implementation, a user responsible for the facility can access billing and collection information associated with motorists that have used the facility.

The dispute management module 26b may permit customers to dispute specific transactions on their accounts and to resolve disputes using the computer 12 or third parties. Disputes may arise during billing situations. The module 26b may help resolve such disputes in an automated fashion. The module 26b can provide a customer to access an "eResolution" section of a controlling/billing authority website. Customers can file a dispute and download an image of their transaction, the one in question. If there is no match (i.e., the customers automobile is not the automobile in the photo frame), the bill can be forwarded for a third party evaluation such as arbitration. In the far more likely case, the photo will show that the customer's automobile was indeed billed correctly. Dispute management can use encrypted security in which all text and images are sent over a computer network (e.g., the Internet) using high strength encryption. Proof of presence images can be embedded into the dispute resolution communication as an electronic watermark.

The payment processing module 26c provides functionality for processing payments manually or electronically, depending on the remittance received. For example, if payment remittance is in the form of a paper check, then scanning devices could be used to convert the paper information into electronic format for further processing. On the other hand if electronic payment is employed, then standard electronic payment techniques can be used. The payment processing module 26c can support billing methods such as traditional mailing, electronic payment (e.g. using a credit card, debit card, smart card, or Automated Clearing House transaction), periodic billing (e.g., send the bill monthly, quarterly, upon reaching a threshold, or other). The payment processing module 26c can support discounts and surcharges based on frequency of usage, method of payment, or time of facility usage. The payment processing module 26c also can support payment collection methods such as traditional check processing, processing payment during renewal of a vehicle registration (with interest accrued), electronic payment, direct debit bank, credit cards, pre-payment, customer-initiated payments (as often as the customer desires), or provide discounts for different purposes.

The toll management computer 12 communicates with external systems 34 using one or more communications techniques compatible with the communications interfaces of the systems. For example, communications interfaces can include computer networks such as the Internet, electronic data interchange (EDI), batch data file transfers, messaging systems, or other interfaces. In one implementation, external systems 34 include law enforcement agencies 36, postal authorities 38, vehicle registration authorities 40, insurance companies 42, service providers 44, financial systems 46 and a homeland security agency 48. The external systems 34 can involve private or public organizations that span one or more geographic locations such as states, regions, countries, or other geographic locations.

The toll management computer 12 can interface and exchange information with law enforcement agencies 36. For example, as vehicles are identified, the computer can submit substantially real-time transactions to law enforcement systems, in formats defined by the law enforcement agencies. Transactions also can be submitted for vehicles carrying hazardous materials or violating traffic regulations (e.g. speeding, weight violations, missing plates), if the appropriate sensors are in place (e.g. laser/sonic/microwave detectors as described above, weight sensors, radiation detectors). Alternatively, vehicle records can be compiled and forwarded in batches, based on lists provided by law enforcement agencies.

The highlighted vehicle identifier database 20 can be used to store the lists provided by the law enforcement agencies. The term "highlighted" refers to the notion that the law enforcement agencies have provided a list of vehicle identifiers that the agencies have indicated (highlighted) they wish the toll facility to monitor. For example, when a motor vehicle is stolen and reported to police, the police can send a list of highlighted vehicle identifiers to the database 20. When the vehicle highlighted by the police travels through facility, the imaging processing module 24 determines a vehicle identifier associated with the vehicle and determines through certain interfaces that the particular vehicle is being sought by law enforcement. The law enforcement authorities may wish to be instantly notified of the location of the vehicle (and driver), the time it was detected at the location, and the direction it was headed. The computer 12 can notify in substantially real-time mobile units associated with law enforcement. In addition, law enforcement can automatically highlight vehicles based upon the expiration of a license, occurrence of a traffic court date, or other event. This could, in turn, help keep illegal drivers off the road and increase revenue to the state.

The toll management computer 12 can interface and exchange information with postal authorities 38. Since the disclosed techniques would require toll authorities to convert from receiving payment by drivers at the time of travel to receiving paying in arrears, it is important that bills be sent to the correct driver/vehicle owner. To minimize the possibility of sending the bill to the wrong person, the computer 12 supports address reconciliation. For example, before a bill is mailed, the computer 12 verifies that the address provided by a motor vehicle department matches the address provided by the postal authority. The motor vehicle database can then be updated with the most accurate address information related to the vehicle owner. Since this occurs before the bill is mailed, billing errors can be reduced.

The toll management computer 12 can interface and exchange information with vehicle registration authorities 40. The registration authorities 40 provide an interface to exchange information related to the owners of vehicles, the owners' addresses, characteristics of the vehicles, or other information. Alternatively, this information can be accessed through third-party data providers rather than through an interface to public motor vehicle records. The accuracy of records in the various databases used by the computer 12, including vehicle ownership and owner addresses, may be verified periodically against third-party databases or government records, including motor vehicle records and address records. This may help ensure the quality of ownership and address records, and reduce billing errors and returned correspondence.

The toll management computer 12 can interface and exchange information with insurance companies 42. Insurance companies could highlight vehicle identifiers in a manner similar to law enforcement authorities 36. For example, the highlighted vehicle identifiers database 20 can include license plate numbers of vehicles with an expired insurance indicating that such drives would be driving illegally. The computer could notify law enforcement as well as insurance companies whether the highlighted vehicle has been detected using a particular facility.

The toll management computer 12 can interface and exchange service providers 44. For example, the computer 12 can support batch or real-time interfaces for forwarding billing and payment collection functions to billing service providers or collection agencies.

The toll management computer 12 can interface and exchange information with financial systems 46. For example, to handle bill payment and collection, the computer 12 can interface to credit card processors, banks, and third-party electronic bill presentment systems. The computer 12 can also exchange information with accounting systems.

The toll management computer 12 can interface and exchange information with the homeland security agency 48. The office of homeland security can automatically provide a list of individuals for use in the highlighted vehicle identifier database 20. For example, registered drivers that are on a visa to this country can be automatically highlighted when that visa expires. The computer 12 would then notify the office of homeland security 48 that the highlighted vehicle identifier associated with the person has been detected driving in the country including the time and location information about the vehicle.

As described above, data captured from the toll site flows into the image database, and is retrieved from the image database by the billing engine. In another implementation, the toll computer detects, for each vehicle, an interaction between the vehicle and a toll facility, captures images and generates a data record. The data record can include date, time, and location of transaction, a reference to the image file, and any other data available from the sensors at the facility (e.g., speed, size). The image can be passed to the image-processing module 25, which can generate a vehicle identifier, a state, and a confidence factor for each vehicle.

This information can be added to the data record. (This process my occur after transmission to the central facility.)

The data record and image file can be sent to the central facility. The image can be stored in the image database, and referenced if (a) additional processing is required to identify the vehicle, or (b) someone wishes to verify the transaction. If the confidence level is adequate, the data record can be submitted to the billing engine, which can associate it with an account and store it in the billing database for later billing. If no account exists, the vehicle identifier is submitted to the appropriate state registration authority or a third-party service provider to determine the owner and establish an account. This process may be delayed until enough transactions are collected for the vehicle to justify issuing a bill. If confidence level is not adequate, additional processing may be performed as described elsewhere.

The techniques described above describe the flow of data based on a single transaction end-to-end, then looping back to the beginning. In another implementation, some of the functions described may be event-driven or scheduled, and may operate independently of one another. For example, there may be no flow of control from back-end processes to vehicle imaging. The imaging process may be initiated by an event, including the presence of a vehicle at the toll site.

In another implementation, the system may be used to monitor traffic and manage incidents. For example, if a drop in average vehicle speed is detected, the computer can send a message to a highway control facility alerting controllers to the possibility of an incident. Authorized controllers may communicate with the equipment at the toll site to view images from the cameras and determine if a response is required.

The operation of the toll management system 10 is explained with reference to FIGS. 2-5.

Figure 2:
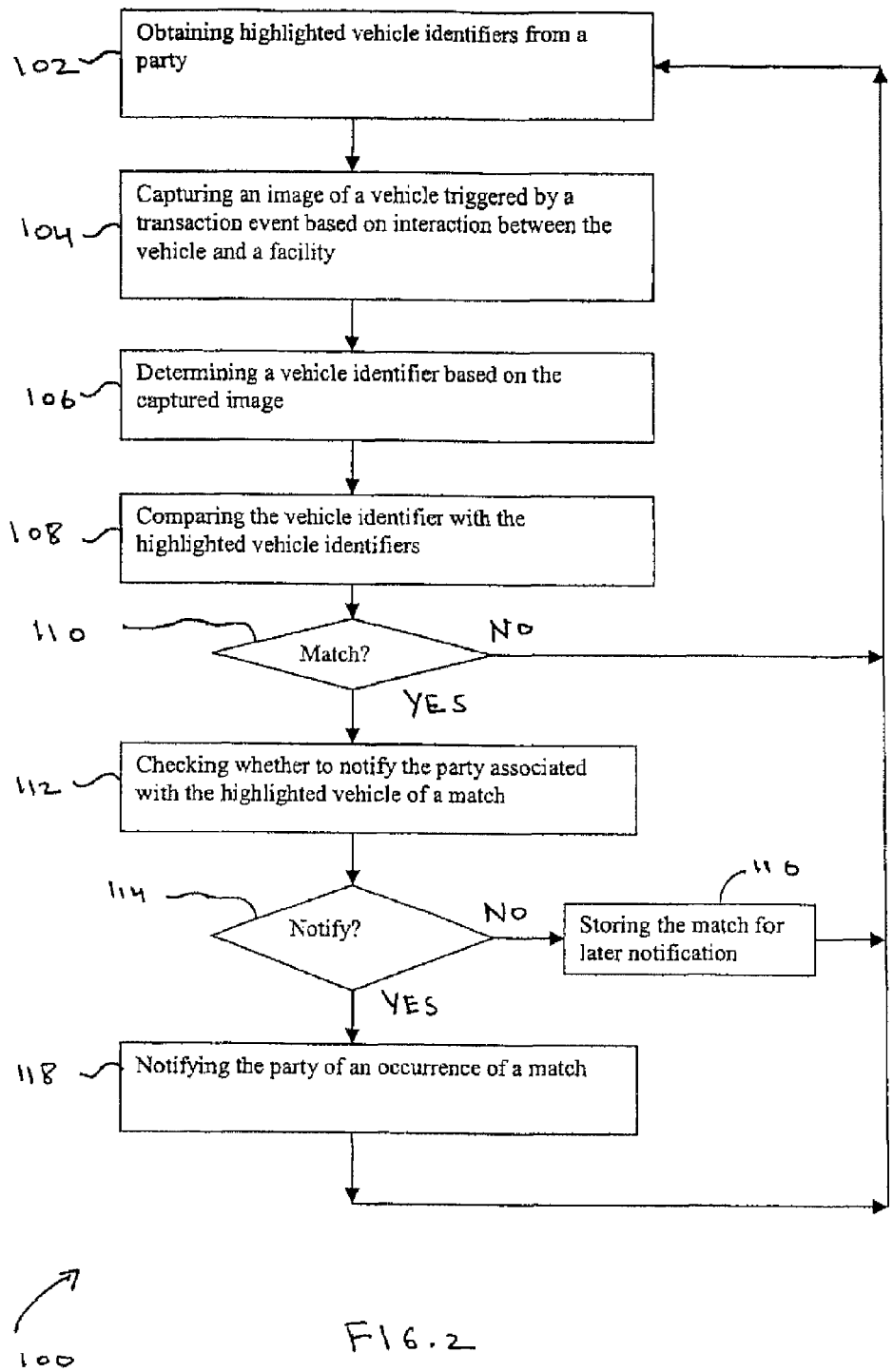
FIG. 2 is a flow chart of an implementation of an electronic toll management system related to highlighted vehicle identifier management.

FIG. 2 is a flow chart of an implementation of electronic toll management system related, particularly a process 100 for managing highlighted vehicle identifiers 20 provided by external systems 34. To illustrate, in one example, it is assumed that law enforcement agencies 36 generate a list of highlighted vehicle identifiers (e.g., license plate numbers) of drivers being sought by the agencies and that the agencies 36 wish to be notified when such vehicles have been identified using a toll facility 28.

The computer 12 obtains (block 102) highlighted vehicle identifiers from a party such as law enforcement agencies 36. In one implementation, these vehicle identifiers can be stored in the vehicle identifier database 20 for subsequent processing. The database 20 can be updated by the agencies with new as well as additional information in real-time and/or in batch mode. The law enforcement agencies accessed by the computer span across multiple jurisdictions such as cities, municipalities, states, regions, countries or other geographic designations. As a result, the computer 12 can process vehicle information across multiple jurisdictions and on a national scale.

The computer 12 captures (block 104) an image of a vehicle triggered by a transaction event based on an interaction between the vehicle 30 and the facility 28. For example, the image acquisition module 24 can be used to acquire one or more images of a vehicle as it travels through a facility such as a toll road. These images can be stored in the image database 14 for further processing by the image-processing module 25. Compression techniques can be applied to the captured images to help reduce the size of the database 14.

The computer 12 determines (block 106) a vehicle identifier based on the captured image. For example, as discussed previously, the image-processing module 25 can apply image analysis techniques to the raw images in the image database 14. These analysis techniques can extract a license number from one or more images of a license plate of the vehicle. The extracted vehicle identifiers can be stored in the vehicle identifier database 18 for further processing.

The computer 12 compares (block 108) a captured vehicle identifier with the highlighted vehicle identifier. For example, the computer 12 can compare a captured license plate number from the vehicle identifier database 18 with a license number from the highlighted vehicle identifier database 20. As discussed above, automatic as well as manual techniques can be applied to check for a match.

If the computer 12 detects a match (block 110) between the license numbers, then it checks (block 112) how the party associated with the highlighted vehicle identifiers wishes to be notified. This information can be stored in the vehicle identifier database 20 or other storage mechanism. On the other hand, if there is no match, the computer 12 resumes executing the process 100 beginning at block 102.

If the party indicates that it wishes to be notified immediately (block 114), then the computer notifies (block 118) the party upon the occurrence of a match. In this example, the computer can notify law enforcement of the match in substantially real-time using wireless communications techniques or over a computer network.

On the other hand, if the party does not wish to be notified immediately (block 114), then the computer 12 stores (block 116) the match for later notification upon satisfaction of predefined criteria. In one implementation, predefined criteria can include gathering a predefined number of matches and then sending the matches to law enforcement in batch mode.

Once the party has been notified (block 118) of a match or the match has been stored for later notification (block 116), the computer 12 resumes executing process 100 beginning at block 102.

Figure 3:
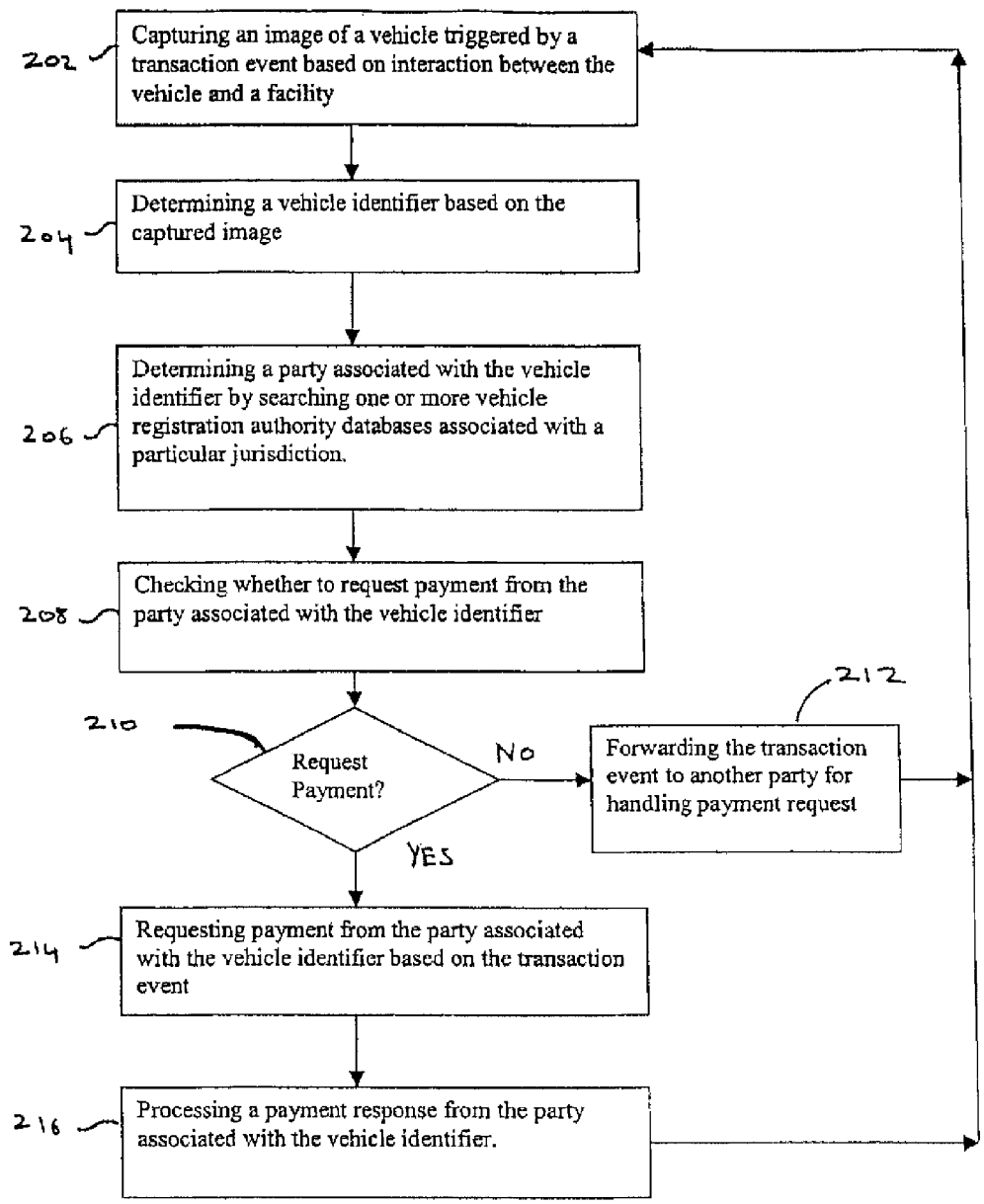
FIG. 3 is a flow chart of an implementation of an electronic toll management system related to payment management.

FIG. 3 is a flow chart of an implementation of electronic toll management system 10, particularly a process 200 for managing payment from a party associated with a vehicle that has interacted with a facility. To illustrate, in one example, it is assumed that a toll road authority decides to employ the disclosed techniques to handle payment processing including billing and collecting tolls from vehicles using its toll road.

The computer 12 captures (block 202) an image of a vehicle triggered by a transaction event based on an interaction between the vehicle and a facility. This function is similar to the process discussed above in reference to block 104 of FIG. 2. For example, the image acquisition module 24 can be used to acquire one or more images of a vehicle 30 as it travels through the toll road 28. These images can be stored in the image database 14 for further processing by the image-processing module 25.

The computer 12 determines (block 204) a vehicle identifier based on the captured image. This function is also similar to the process discussed above in reference to block 106 of FIG. 2. For example, the image-processing module 25 can be used to extract a license number from one or more images of a license plate of the vehicle. These vehicle identifiers can be stored in the vehicle identifier database 18 for further processing.

The computer 12 determines (block 206) a party associated with the vehicle identifier by searching a registration authority databases. For example, the computer 12 can use the vehicle identifier from the vehicle identifier database 18 to search a database of a vehicle registration authority 40 to determine the registered owner of the vehicle associated with the vehicle identifier. The computer 12 is capable of accessing vehicle information from one or more vehicle registration databases across multiple jurisdictions such as cities, municipalities, states, regions, countries or other geographic locations. In one implementation, the computer 12 can maintain a copy of registration information from multiple registration authorities for subsequent processing. Alternatively, the computer 12 can access multiple registration authorities and obtain registration information on a demand basis. In either case, these techniques allow the computer 12 to process vehicle information across multiple jurisdictions, and thus process vehicles on a national scale.

The computer 12 checks (block 208) whether to request payment from the party associated with the vehicle identifier. The request for payment can depend on payment processing information associated with the registered owner. For example, the registered owner may be sent a bill based on a periodic basis (e.g., monthly basis), when a predefined amount has been reached, or other arrangement.

If the computer 12 determines that payment is required (block 210), then it requests (block 214) payment from the party associated with the vehicle identifier based on the transaction event. As discussed above, a request for payment can be generated using traditional mail service techniques or electronic techniques such as electronic payment. The amount of the bill can depend on information from the transaction event such as the nature of the interaction between the vehicle and the facility. For example, the transaction event can indicate that the vehicle traveled a particular distance defined as a distance between a starting and ending point on the toll road. Accordingly, the amount of the payment requested from the registered owner can be based on the distance traveled.

On the other hand, if the computer 12 determines that payment is not required (block 210), then it forwards (block 212) the transaction event to another party to handle the payment request. For example, the toll authority may have decided that the computer 12 can handle image processing functions and that toll billing and collection should be handled by a third party such as external systems 34. In one implementation, the computer 12 can interface with service providers 44 and financial systems 48 to handle all or part of the billing and payment-processing functionality. Once the transaction event has been forwarded to a third party, the computer 12 resumes executing the functions of process 200 beginning at block 202.

If the computer handles payment processing, the computer 12 processes (block 216) a payment response from the party associated with the vehicle identifier. In one implementation, the billing database 16, in conjunction with the billing engine 22 and the customer management module 26, can be used to handle billing and collection functions. As discussed above, the payment processing module 26c can support electronic or manual payment processing depending on the remittance received. For example, the computer 12 can provide an account for handling electronic payment processing over a computer network such as the Internet. The computer can also handle traditional payment receipt such as a check.

Once a payment has been processed (block 216), the computer 12 resumes executing process 200 beginning at block 202.

Figure 4:
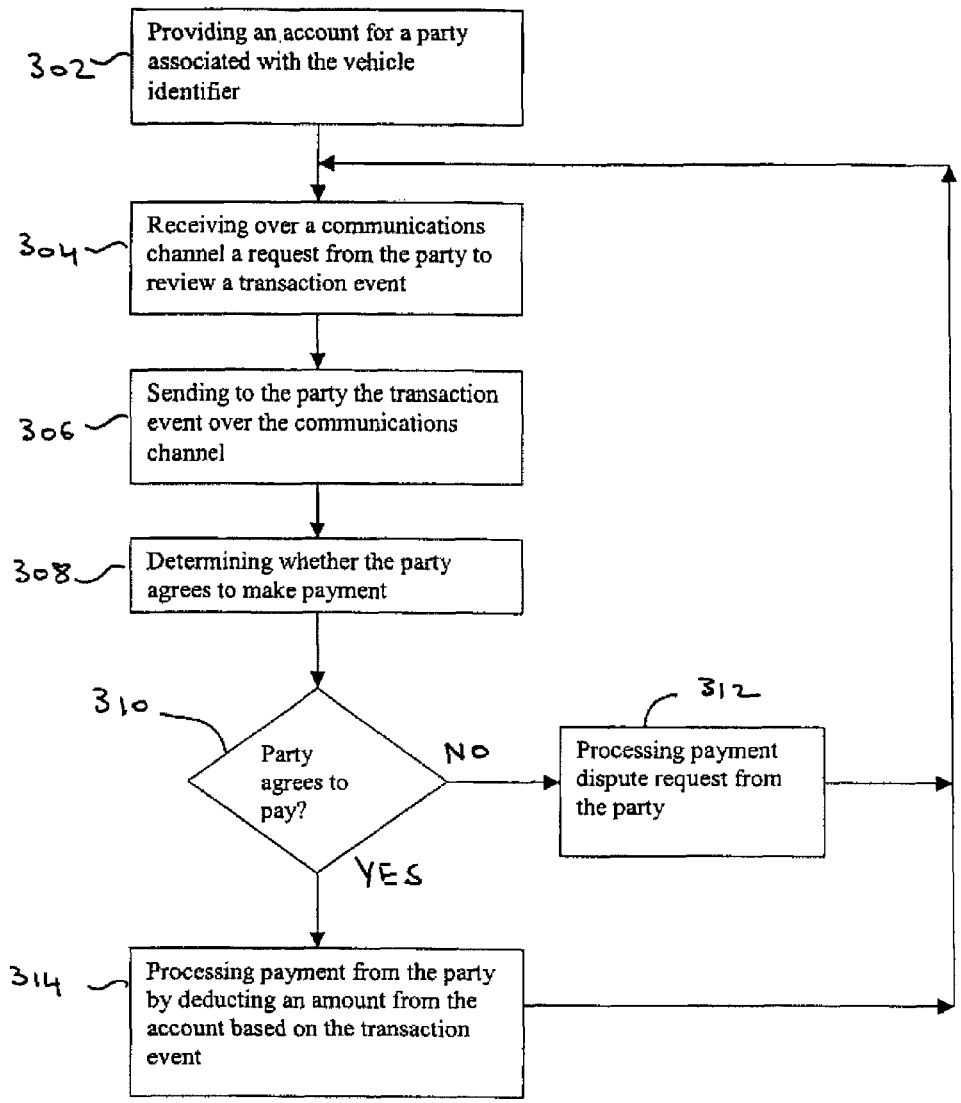
FIG. 4 is a flow chart of an implementation of an electronic toll management system related to payment management.

FIG. 4 is a flow chart of an implementation of electronic toll management system 10, particularly process 300 for managing payment over a communications channel from a party associated with a vehicle that has interacted with a facility. To illustrate, assume a toll authority responsible for a toll road employs the disclosed techniques and that a registered owner wishes to efficiently and automatically make payments for using the toll road.

The computer 12 provides (block 302) an account for a party associated with the vehicle identifier. In one embodiment, the computer 12 in conjunction with the account management module 26a can provide a website for customers to open an account for making electronic payment over a computer network such as the Internet. The website also can permit the customer to access and update account information such as payment history, payment amount due, preferred payment method, or other information.

The computer 12 receives (block 304) a request over a communications channel from the party to review a transaction event. For example, the account payment module 26a can handle this request by retrieving transaction event information associated with the customer's account from the billing database 16. The retrieved information can include image data of a particular transaction involving the customer's vehicle and the tollbooth.

The computer 12 sends (block 306) the transaction event to the party 32 over the communications channel. Information related to the transaction event can include images of the vehicle and the vehicle identifier (i.e., license plate). Such data can be encrypted to permit secure transmission over the Internet. Standard communications protocols such as hypertext markup language (HTML) can be used to transmit the information over the Internet.

The computer 12 determines (block 308) whether the party agrees to make payment. For example, once the customer receives the information related to the transaction event, the customer can review the information to determine whether to make payment based on whether the vehicle shown in the images is the customer's vehicle.

If the computer 12 determines (block 310) that the party agrees to pay, then it processes (block 314) payment from the party by deducting an amount from the account based on the transaction event. For example, if the image information indicates that the transaction event data is accurate, then the customer can authorize payment such as by submitting an electronic payment transaction.

On the other hand, if the computer 12 determines (block 310) that the party does not agrees to pay, then the computer 12 processes (block 312) a payment dispute request from the party. In one implementation, the dispute management module 26b can handle a dispute request submitted by the customer using online techniques. The module 26b can handle specific transactions related to the customer's account including involving a third party to resolve the dispute.

Once a payment has been processed (block 314) or a dispute resolved (block 312), the computer 12 resumes executing process 300 beginning at block 304.

Figure 5:
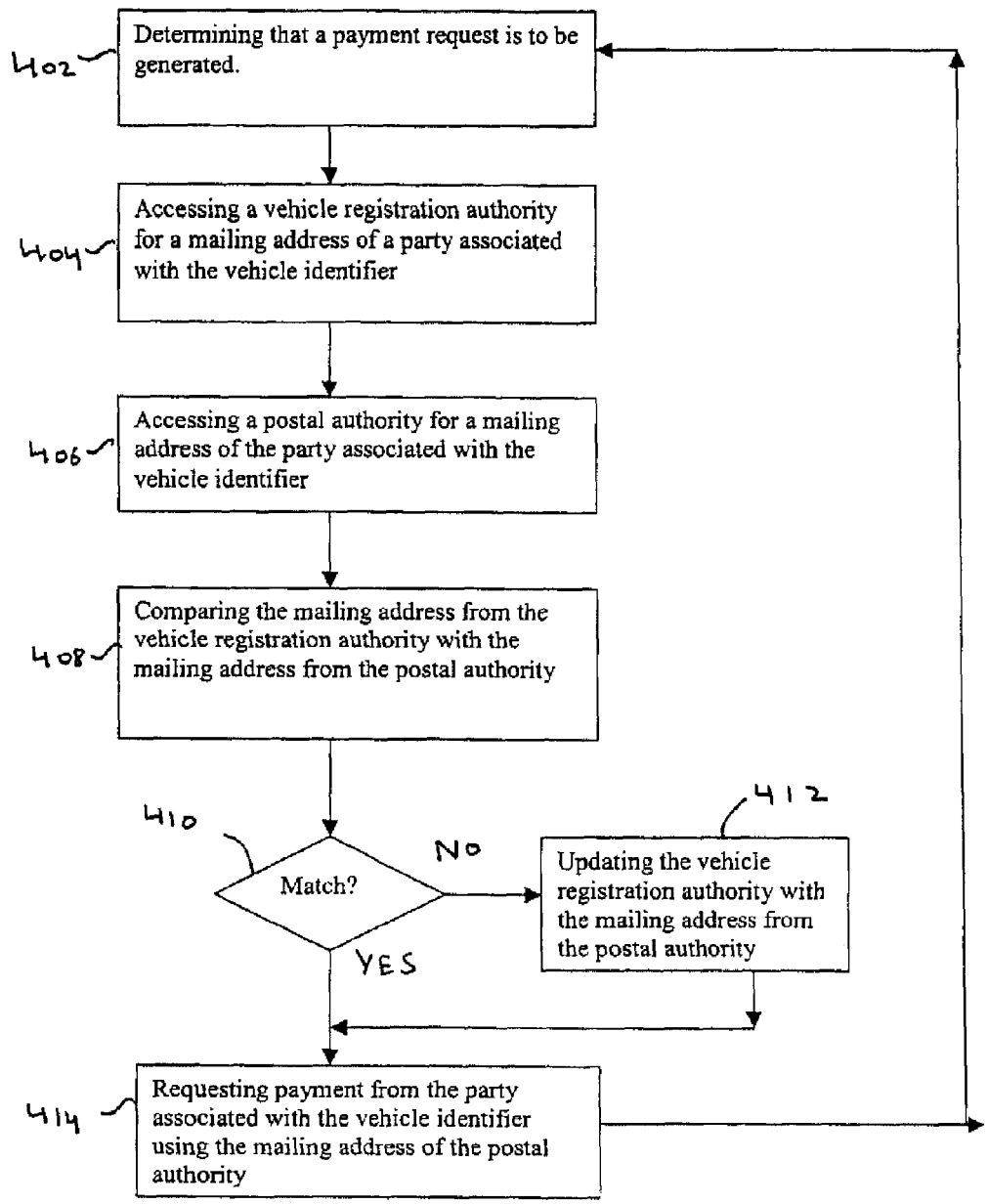
FIG. 5 is a flow chart of an implementation of an electronic toll management system related to mailing address verification.

FIG. 5 is a flow chart of an implementation of electronic toll management system, particularly a process 400 for reconciling mailing addresses from different sources. To illustrate, it is assumed that a toll authority has decided to employ the disclosed techniques for processing payment related to the use of toll facility. Since the disclosed techniques involve processing payment some time after the vehicle has traveled through the toll authority, these techniques help ensure that payment is sent to the correct address of the registered owner of the vehicle.

The computer 12 determines (block 402) that a payment request is to be sent to a party associated with a vehicle identifier. As explained above, for example, payment requests may be generated based on a periodic basis or on an amount threshold basis.

The computer 12 accesses (block 404) a vehicle registration authority for a mailing address of a party associated with the vehicle identifier. For example, the computer 12 may access one or more databases associated with vehicle registration authorities 40 to retrieve information such as the mailing address of the registered owner of the vehicle.

The computer 12 accesses (block 406) a postal authority for a mailing address of the party associated with the vehicle identifier. For example, the computer 12 may access one or more databases associated with postal authorities 38 to retrieve information such as the mailing address of the registered owner of the vehicle.

The computer 12 compares (block 408) the mailing address from the vehicle registration authority with the mailing address from the postal authority. For example, the computer compares the mailing addresses from the two authorities to determine if there is a discrepancy between the database information.

If the computer 12 determines (block 410) that the addresses match, then it requests (block 414) payment from the party associated with the vehicle identifier using the mailing address accessed from the postal authority. For example, the computer 12 can use the techniques discussed above to handle payment processing including billing and collecting payment from the registered owner.

On the other hand, if the computer 12 determines (block 410) that the addresses do not match, it then updates (block 412) the vehicle registration authority with the mailing address from the postal authority. For example, the computer 12 can update databases associated with vehicle registration authorities 40 with the correct mailing address retrieved from the postal authorities 38. Such techniques may help reduce the likelihood of mailing a bill to an incorrect mailing address resulting in an reducing time for payment remittance.

Once the vehicle registration authority has been updated (block 412) or payment requested (block 414), the computer 12 executes process 400 beginning at block 402 as explained above.

Figure 6:
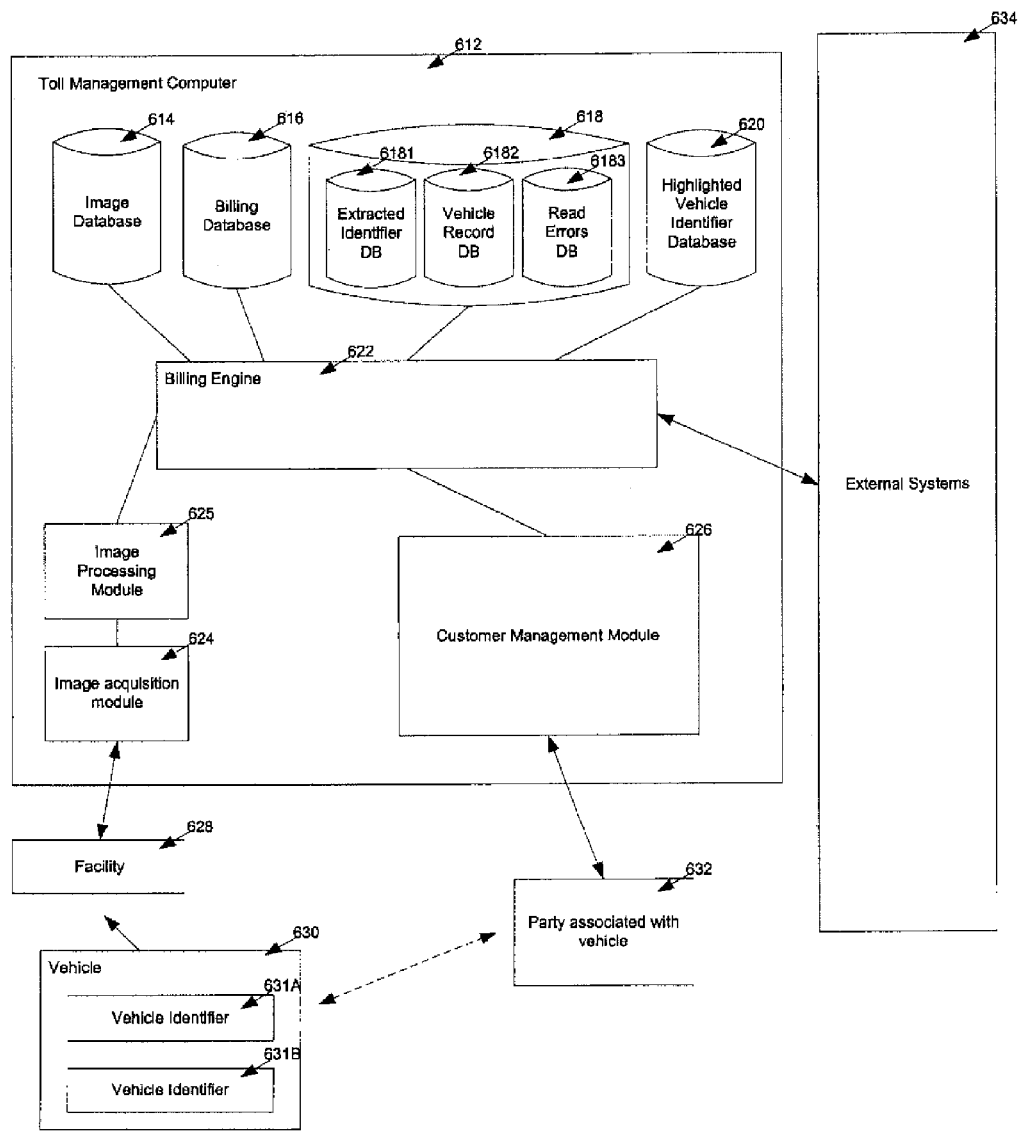
FIG. 6 is a block diagram of an implementation of an electronic toll management system.

FIG. 6 is a block diagram of an implementation of an electronic toll management system 600 that provides vehicle identification by extracting multiple vehicle identifiers for each vehicle that interacts with the toll facility. The toll management system 600 includes a toll management computer 612. The toll management computer includes an image database 614, a billing database 616, a vehicle identification database 618, a highlighted vehicle identifier database 620, a billing engine 622, an image acquisition module 624, an image processing module 625, and a customer management module 626. The toll management computer 612 communicates with or is integrated with a toll facility 628, which interacts with a vehicle 630 and a party associated with the vehicle 632. The toll management computer 612 also communicates with external systems 634.

Examples of each element within the toll management system 600 of FIG. 6 are described broadly above with respect to FIG. 1. In particular, the toll management computer 612, the image database 614, the billing database 616, the vehicle identification database 618, the highlighted vehicle identifier database 620, the billing engine 622, the image acquisition module 624, the image processing module 625, the customer management module 626, and the toll facility 628 typically have attributes comparable to and illustrate one possible implementation of the toll management computer 12, the image database 14, the billing database 16, the vehicle identification database 18, the highlighted vehicle identifier database 20, the billing engine 22, the image acquisition module 24, the image processing module 25, the customer management module 26, and the toll facility 28 of FIG. 1, respectively. Likewise, the vehicle 630, the party associated with the vehicle 632, and the external systems 634 typically have attributes comparable to the vehicle 30, the party associated with the vehicle 32, and the external systems 34 of FIG. 1.

The vehicle identification database 618 includes an extracted identifier database 6181, a vehicle record database 6182, and a read errors database 6183. The functions of the databases 6181-6183 are described in more detail below.

The system 600 is similar to system 10 and is configured to provide, for example, reduced vehicle identification error rates by identifying each vehicle through use of multiple vehicle identifiers. Two such identifiers are designated as 631A and 631B. A vehicle identifier is preferably an identifier that uniquely or substantially uniquely identifies the vehicle but may be an identifier that helps in the identification process by distinguishing the vehicle from other vehicles without necessarily uniquely identifying the vehicle. Identifiers 631A and 631B may be part of vehicle 630, as suggested by FIG. 6, but need not be. For example, identifiers 631A and/or 631B may be produced by image processing module 625 based on characteristics of the vehicle 630.

As described previously, one example of a vehicle identifier is license plate information of a vehicle, such as a license plate number and state. The image processing module 625 may determine the license plate information of a vehicle from an image of the license plate by using OCR, template matching, and other analysis techniques. A license plate number may include any character but is typically restricted to alphanumeric characters. License plate information typically may be used to uniquely identify the vehicle.

Another example of a vehicle identifier is a vehicle detection tag as described in U.S. Pat. No. 6,747,687, hereby incorporated by reference in its entirety for all purposes. The vehicle detection tag, hereinafter referred to as a vehicle fingerprint, is a distilled set of data artifacts that represent the visual signature of the vehicle. The image processing module 625 may generate a vehicle fingerprint by processing an image of the vehicle. To save on processing time and storage needs however, the generated vehicle fingerprint typically does not include the normal "picture" information that a human would recognize. Accordingly, it is usually not possible process the vehicle fingerprint to obtain the original vehicle image. Some vehicle fingerprints, however, may include normal picture information. A vehicle fingerprint typically may be used to uniquely identify the vehicle.

In one implementation, a camera in the image acquisition module 624 captures a single "still" image of the back of each vehicle that passes the toll facility 628. For each vehicle, the image processing module 625 recognizes the visual cues that are unique to the vehicle and reduces them into a vehicle fingerprint. Because a license plate is a very unique feature, the image processing module 625 typically maximizes the use of the license plate in creating the vehicle fingerprint. Notably, the vehicle fingerprint also includes other parts of the vehicle in addition to the license plate and, therefore, vehicle identification through matching of vehicle fingerprints is generally considered more accurate than vehicle identification through license plate information matching. The vehicle fingerprint may include, for example, portions of the vehicle around the license plate and/or parts of the bumper and the wheelbase.

Another example of a vehicle identifier is a vehicle signature generated using a laser scan (hereinafter referred to as a laser signature). The laser signature information that may be captured using a laser scan may include one or more of an overhead electronic profile of the vehicle, including the length, width, and height of the vehicle, an axle count of the vehicle, and a 3D image of the vehicle. In one implementation, the image acquisition module 624 includes two lasers for a given lane, one that is mounted over the lane and another that is mounted alongside of the lane. The laser mounted above the lane typically scans the vehicle to capture the overhead profile of the vehicle, and the laser mounted alongside or above of the lane typically scans the vehicle to capture the axle count of the vehicle. Together, both lasers are also able to generate a 3D image of the vehicle. A laser signature may be used to uniquely identify some vehicles. For example, vehicles that have been modified to have a distinctive shape may be uniquely identified by a laser signature.

Another example of a vehicle identifier is a vehicle signature generated using a magnetic scan (hereinafter referred to as an inductive signature). The inductive signature of a vehicle is a parameter that reflects the metal distribution across the vehicle and, therefore, may be used to classify the vehicle and, in some circumstances, to uniquely identify the vehicle (e.g., if the metal distribution of a particular vehicle is unique to that vehicle because of unique modifications to that vehicle). The inductive signature may include information that may be used to determine one or more of the axle count (and likely the number of tires) of the vehicle, the type of engine used in the vehicle, and the type or class of vehicle. In one implementation, the image acquisition module 624 includes a pair of vehicle detection loops, an axle detection loop, and a camera trigger loop in each lane.

Once the two or more vehicle identifiers are extracted by the image processing module 625, the image processing module 625 stores the extracted vehicle identifiers in the extracted vehicle identifier database 6181. Ideally, the computer 612 would then be able to uniquely identify the owner of the vehicle by choosing a vehicle identifier that uniquely identifies the vehicle (e.g., license plate information or vehicle fingerprint) and searching one or more internal or external vehicle record databases for a record containing a matching vehicle identifier. Unfortunately, extracting a vehicle identifier is an imperfect process. The extracted vehicle identifier may not correspond to the actual vehicle identifier, and therefore, may not uniquely identify the vehicle. An incorrectly or partially extracted vehicle identifier may not match the vehicle identifier of any vehicle, may match the vehicle identifier of the wrong vehicle, or may match the vehicle identifiers of more than one vehicle. To increase identification accuracy, the computer 612 of the system 600 implements a multi-tier identification process using two or more vehicle identifiers.

Figure 7:
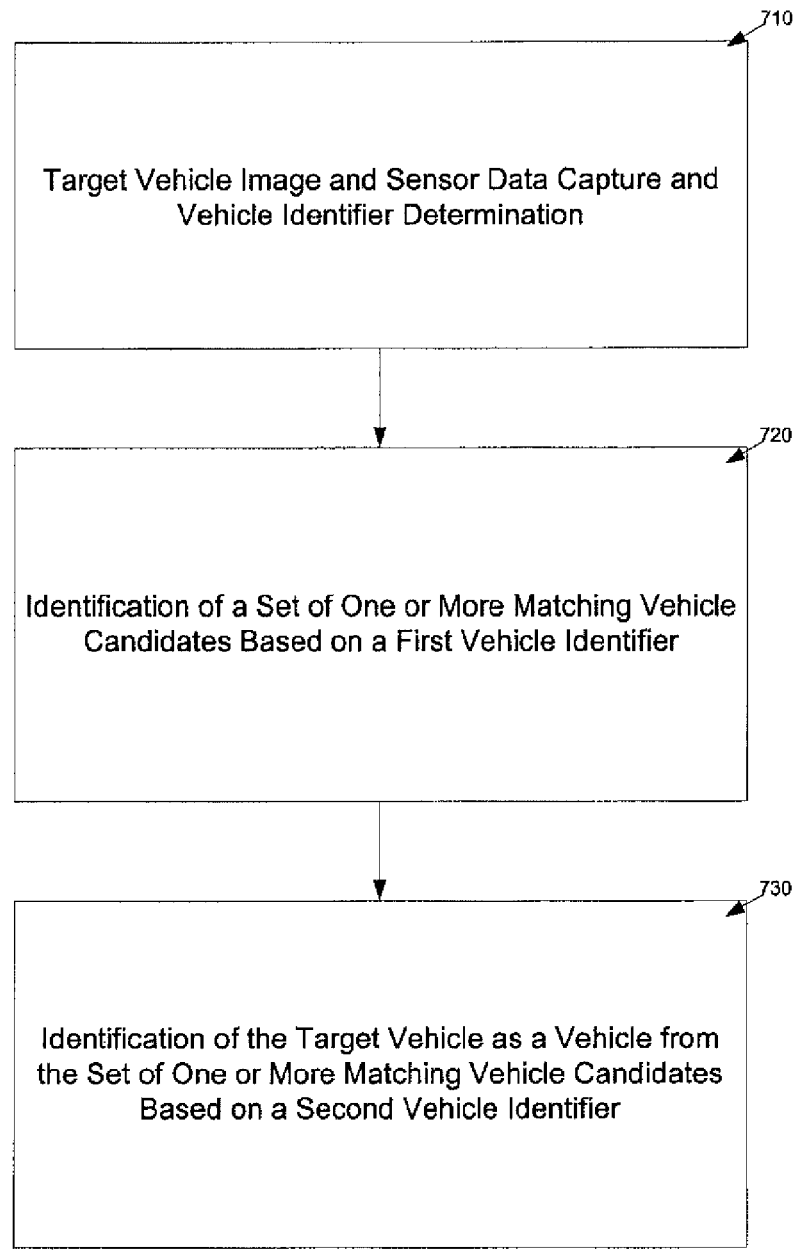
FIG. 7 is a flow chart of an implementation of an electronic toll management system related to vehicle identification.

FIG. 7 is a flow chart of an exemplary two-tier identification process 700 that may be implemented to increase the accuracy of vehicle identification. Image and/or sensor data is captured for a vehicle that interacts with a toll facility (hereinafter referred to as the "target vehicle") and two vehicle identifiers are extracted from the captured data (block 710). In one implementation, only image data is collected and the two vehicle identifiers extracted are a license plate number and a vehicle fingerprint. In another implementation, image data and inductive sensor data are collected and the vehicle identifiers extracted are the vehicle fingerprint and the inductive signature.

One of the two extracted vehicle identifiers is designated as the first vehicle identifier and used to identify a set of one or more matching vehicle candidates (block 720). Typically, the vehicle identifier that is deemed to be the least able to accurately and/or uniquely identify the target vehicle is designated as the first vehicle identifier. For example, if the two extracted vehicle identifiers were license plate number and vehicle fingerprint, the license plate number would be designated as the first vehicle identifier because of the lower expected accuracy of vehicle identification through license plate matching as compared to fingerprint matching. The one or more matching vehicle candidates may be determined, for example, by accessing a vehicle record database and finding records that contain vehicle identifiers that match or nearly match the first vehicle identifier.

Once the set of one or more matching vehicle candidates is determined, the target vehicle is identified from the set based on the second vehicle identifier (block 730). For example, if 12 vehicle candidates were identified as matching a partially extracted license plate number, the target vehicle is identified by accessing the vehicle fingerprints for each of the 12 vehicle candidates and determining which of the 12 vehicle fingerprints matches the extracted vehicle fingerprint. If no match is found within a predetermined confidence threshold, manual identification of the vehicle may be used. In another implementation, one or more larger sets (e.g., supersets) of matching vehicle candidates are determined successively or concurrently by changing (e.g., loosening) the criteria for matching and additional attempts are made to identify the target vehicle from each of the one or more larger sets prior to resorting to manual identification.

In some implementations, the toll management system may be purposefully designed to identify a larger set of matching vehicle candidates during operation 720 to, for example, ensure that the expected lesser accuracy of vehicle identification through the first identifier does not erroneously result in exclusion of the target vehicle from the set of matching vehicle candidates. For example, if the first vehicle identifier is a license plate number, the license plate reading algorithm may be intentionally modified in, for example, two ways: (1) the matching criteria of the license plate reading algorithm may be loosened to enable the algorithm to generate a larger set of matching vehicle candidates and (2) the license plate reading algorithm may be "detuned" by lowering the read confidence threshold used to determine whether a read result is included in the matching candidate set. For instance, the license plate reading algorithm may be loosened to only require a matching vehicle candidate to match a subset or lesser number of the characters in the license plate number extracted for the target vehicle. Additionally or alternatively, the read confidence threshold may be lowered to enable previously suspected incorrect reads (i.e., partial or low confidence reads) to be included in the matching vehicle candidate set.

The two-tier identification process 700 provides greater identification accuracy over a single-tier/single identifier identification system by requiring that two vehicle identifiers be successfully matched for successful vehicle identification. Moreover, the process 700 may provide greater identification speed by limiting the matching of the second vehicle identifier to only those vehicle candidates having records that successfully match the first vehicle identifier. This can provide increased speed if, for example, the extracted second vehicle identifier is time-consuming to match against other such identifiers or if a large number of other such identifiers exists (e.g., millions of identifiers for millions of vehicles in a vehicle database).

In another implementation, two or more second identifiers are used to identify the target vehicle from among the set of matching vehicle candidates. Each of the second identifiers must match the same candidate vehicle to within a predetermined confidence level for successful vehicle identification. Alternatively, the degree of matching of each of the two or more second identifiers may be weighted and a combined equivalent matching score may be generated. If the combined equivalent matching score is above a predetermined threshold, the identification is deemed successful.

In one implementation, each second vehicle identifier is assigned a match confidence level number that ranges from 1 to 10, where 1 corresponds to no match and 10 corresponds to an exact match. Each vehicle identifier is also assigned a weight value from 1 to 10, with greater weight values being assigned to vehicle identifiers that are considered more accurate in uniquely identifying vehicles. If, for example, the second vehicle identifiers are a laser signature and license plate information, a weighting of 6 may be assigned to the laser signature and a greater weighting of 9 may be assigned to the license plate information. If a combined equivalent matching score of 100 is necessary for an identification to be deemed successful and the license plate information matches to a confidence level of 7 and the laser signature also matches to a confidence level of 7, the combined equivalent matching score would be 7*6+7*9=105 and the identification would be considered successful.

In another implementation, two or more first vehicle identifiers are used to identify vehicles in the set of matching vehicle candidates. Each of the first vehicle identifiers for a possible candidate vehicle must match the target vehicle to within a predetermined confidence level for the possible candidate vehicle to be included in the set of matching vehicle candidates. Alternatively, the degree of matching of each of the two or more first identifiers may be weighted and a combined equivalent matching score may be generated. If the combined equivalent matching score is above a predetermined threshold, the possible candidate vehicle is included in the set of matching vehicle candidates.

In another implementation, the second identifier is not used to uniquely identify the target vehicle from among the vehicles in the set of matching vehicle candidates. Rather, the second identifier is used to generate a new and smaller set of matching vehicle candidates as a subset of the set determined using the first identifier, and a third identifier is then used to uniquely identify the target vehicle from this subset of matching vehicle candidates. In yet another implementation, multiple vehicle identifiers are used to successively reduce the set of matching vehicle candidates and the target vehicle is uniquely identified from the successively reduced subset through use of one or more final vehicle identifiers. In yet another implementation, each of the multiple vehicle identifiers is used to generate its own set of matching vehicle candidates through matching and near matching techniques and the reduced set is the intersection of all of the determined sets. In yet another implementation, the reduced set is determined using a combination of the above-described techniques.

Figure 8:
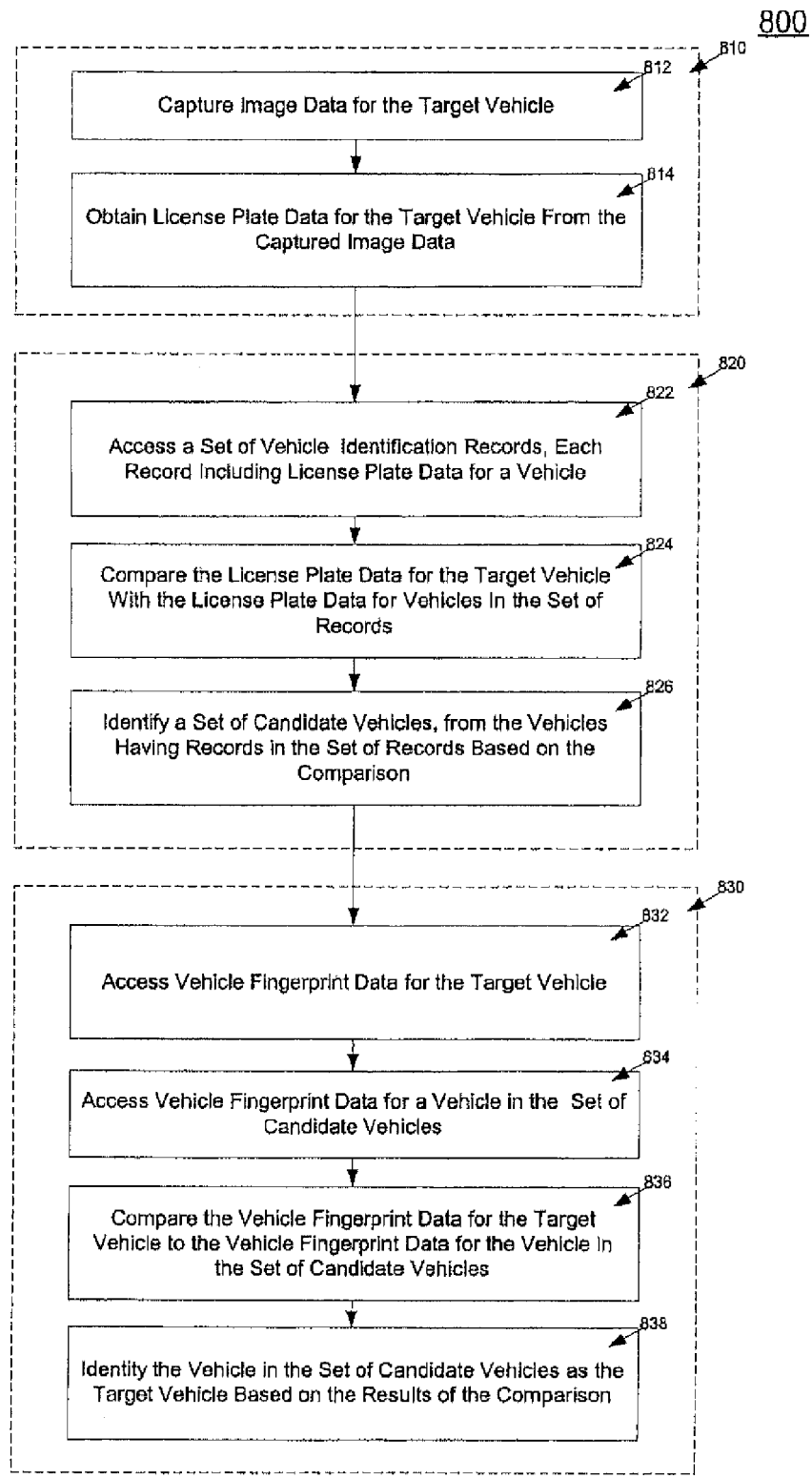
FIG. 8. is a flow chart of an implementation of an electronic toll management system related to vehicle identification.

FIG. 8 is a flow chart of an exemplary two-tier identification process 800 that may be implemented to increase the accuracy and/or automation of vehicle identification. Process 800 is an implementation of process 700 wherein the first identifier is a license plate number and the second identifier is a vehicle fingerprint. In particular, process 800 includes operations 810-830, and associated sub-operations, that correspond to and illustrate one possible implementation of operations 710-730, respectively. For convenience, particular components described with respect to FIG. 6 are referenced as performing the process 800. However, similar methodologies may be applied in other implementations where different components are used to define the structure of the system, or where the functionality is distributed differently among the components shown by FIG. 6.

The image acquisition module 624 captures image data for the target vehicle based on an interaction between the target vehicle and the toll facility 628 (block 812). In another implementation, the image acquisition module 624 additionally or alternatively captures sensor data including, for example, laser scanning and/or loop sensor data. The image processing module 625 obtains license plate data, including, for example, a complete or partial license plate number and state, for the target vehicle from the captured image data (block 814). Optionally, the image processing module 625 also may determine a vehicle fingerprint for the target vehicle from the image data. In another implementation, the image processing module 625 may determine other vehicle signature data, such as, for example, laser and/or inductive signature data, from the image data and/or sensor data.

The computer 612 stores the captured image data in the image database 614 and stores the extracted license plate data in the extracted identifier database 6181. If applicable, the toll management computer 612 also stores the extracted vehicle fingerprint and other signature data, such as, for example, the inductive signature and/or laser signature, in the extracted identifier database 6181.

The computer 612 accesses a set of vehicle identification records from the vehicle record database 6182 (block 822). Each of the vehicle identification records associates an owner/driver of a vehicle with vehicle identifier data. The computer 612 compares the extracted license plate data with the license plate data in the set of vehicle identification records (block 824) and identifies a set of candidate vehicles from the vehicles having records in the set of records (block 826). The comparison may be done using matching or near matching techniques.

The computer 612 accesses extracted vehicle fingerprint data for the target vehicle (block 832). If the vehicle fingerprint has not already been determined/extracted from the captured image data, the computer 612 calculates the vehicle fingerprint and stores the vehicle fingerprint in the extracted vehicle identifier database 6181.

The computer 612 accesses vehicle fingerprint data for a vehicle in the set of candidate vehicles by accessing the corresponding vehicle identification record (block 834) and compares the vehicle fingerprint data for the target vehicle to the vehicle fingerprint data for the candidate vehicle (block 836). The computer 612 identifies the candidate vehicle as the target vehicle based on the results of the comparison of the vehicle fingerprint data (block 838). If the vehicle fingerprint data matches within a predetermined confidence threshold, the candidate vehicle is deemed to be the target vehicle, and the owner/driver of the candidate vehicle is deemed to be the owner/driver of the target vehicle.

Figure 9A:
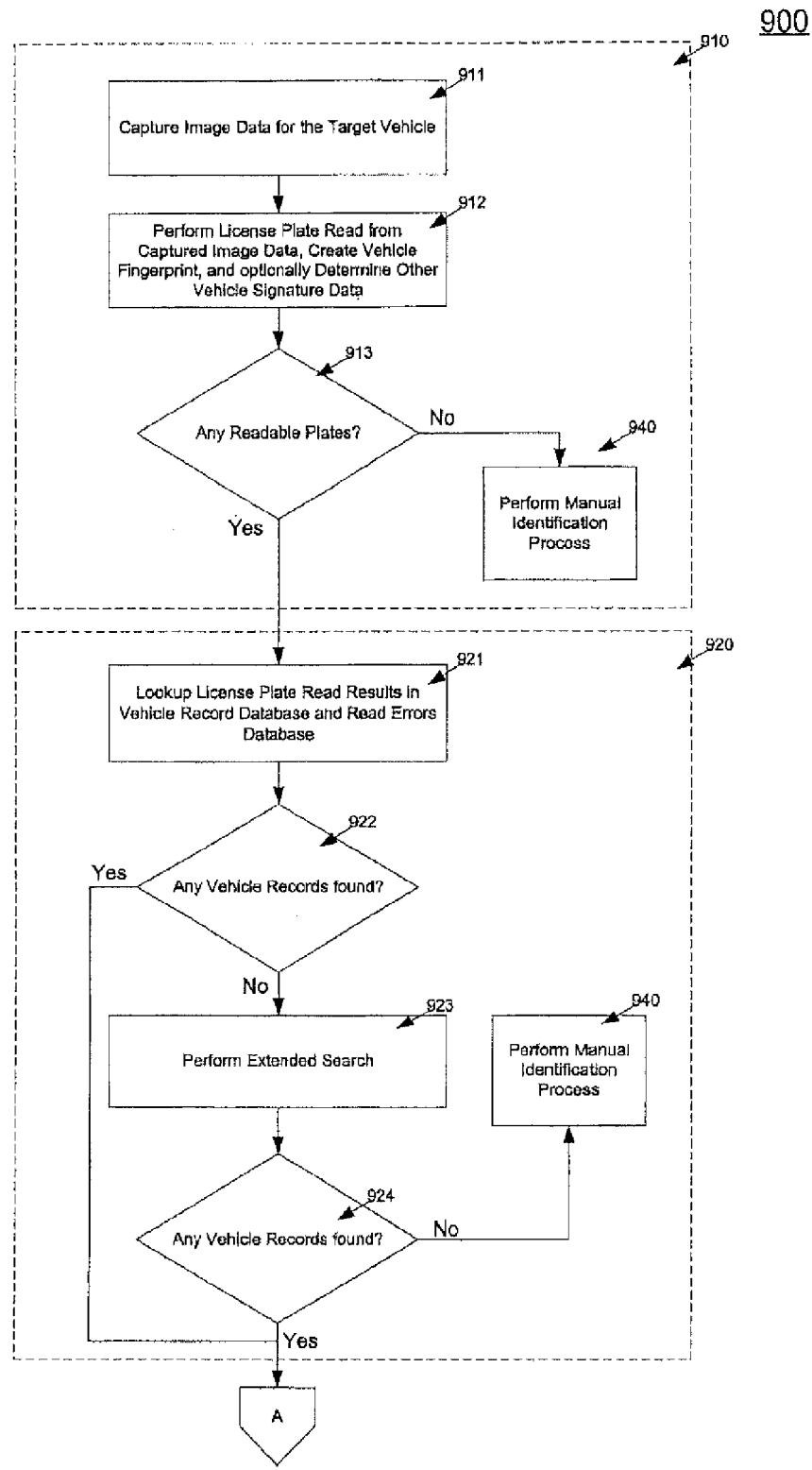
FIGS. 9A-9C are a flow chart of an implementation of an electronic toll management system related to vehicle identification.
Figure 9B:
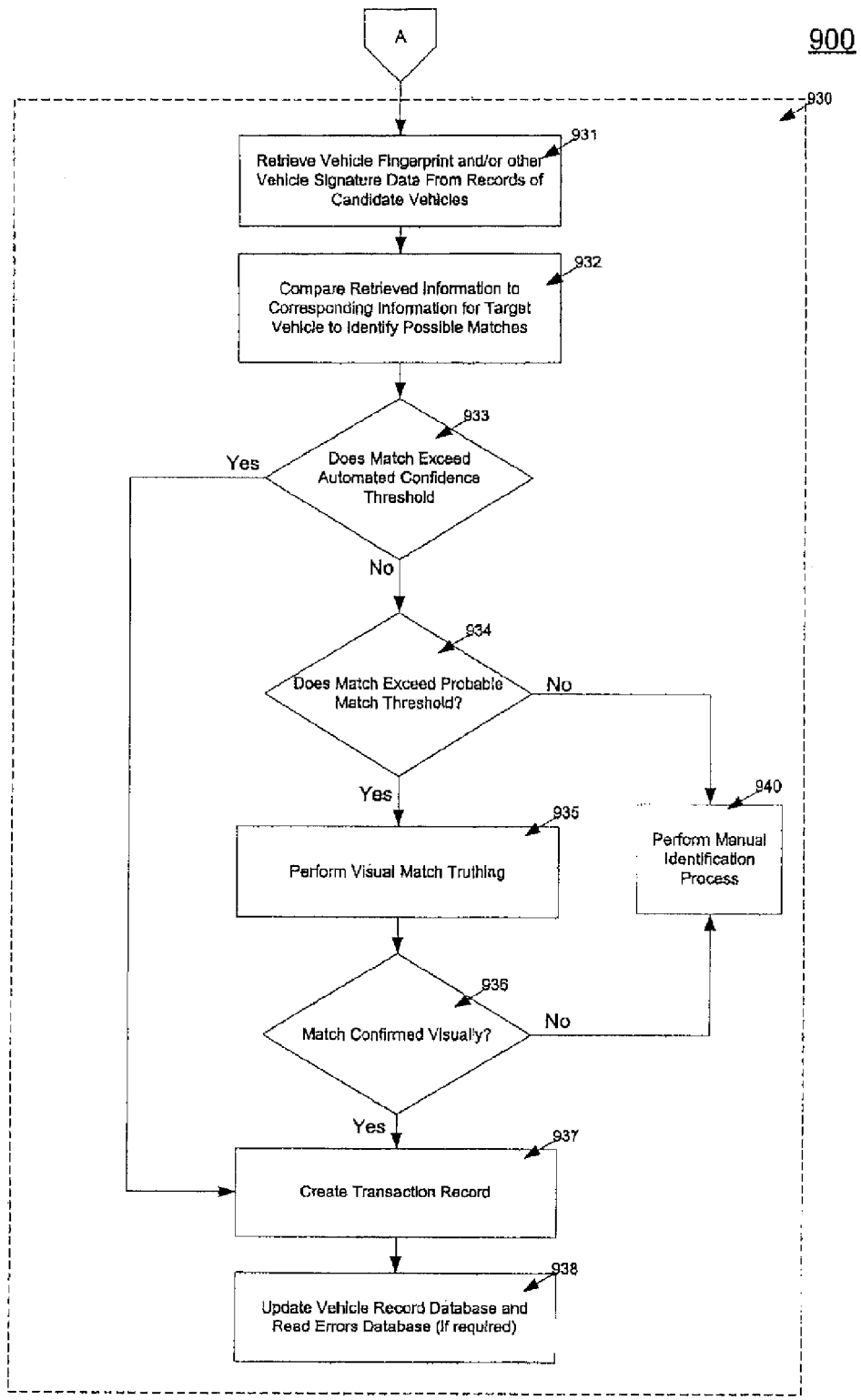
Figure 9C:
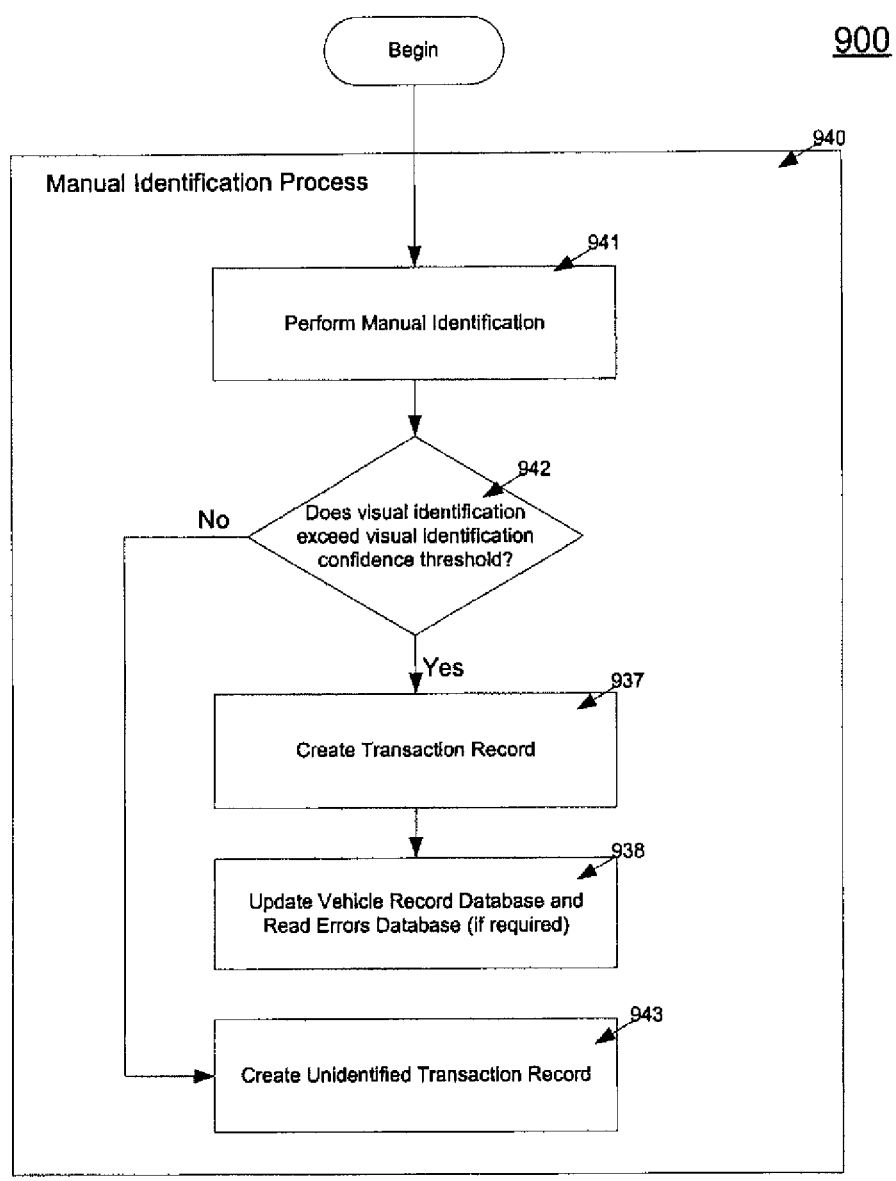

FIGS. 9A-9C are a flow chart of an exemplary two-tier identification process 900 that may be implemented to increase the accuracy of vehicle identification while minimizing the need for manual identification of vehicles. Process 900 is another implementation of process 700 wherein the first identifier is a license plate number and the second identifier is a vehicle fingerprint. In particular, process 900 includes operations 910-930, and associated sub-operations, that correspond to and illustrate one possible implementation of operations 710-730, respectively. For convenience, particular components described with respect to FIG. 6 are referenced as performing the process 800. However, similar methodologies may be applied in other implementations where different components are used to define the structure of the system, or where the functionality is distributed differently among the components shown by FIG. 6.

The image acquisition module 624 captures image and sensor data for the target vehicle (block 911). Roadside sensors, for example, trigger cameras that capture front and rear images of the target vehicle. Other sensors may capture additional data used for classification/identification of the vehicle. For example, a laser scan may be used to determine laser signature data including the height, width, length, axle count, and vehicle dimensional profile. Sensors also may be used to determine data related to the transaction between the target vehicle and the toll facility 628 such as, for example, the weight of the vehicle, the speed of the vehicle, and transponder data associated with the vehicle.

The image processing module 625 performs a license plate read on the captured image data, creates a vehicle fingerprint from the captured image data, and optionally determines other vehicle signature/classification data from the captured sensor data (block 912). For example, the image processing module 625 may use an automated license plate read algorithm to read one or more of the captured images. The license plate read algorithm may read the captured images, for example, in a prioritized order based on visibility of the plate and its location in the image. The license plate read results may include one or more of a license plate number, a license plate state, a license plate style, a read confidence score, a plate location in the image, and a plate size. The image processing module 625 also may apply a visual signature extraction algorithm to generate the vehicle fingerprint for the target vehicle. The visual signature extraction algorithm may be similar to that developed by JAI-PULNiX Inc. of San Jose, Calif. and described in U.S. Pat. No. 6,747,687. The computer 612 stores the captured images in the image database 614 and stores the license plate read results, vehicle fingerprint, and other vehicle signature/classification data in the extracted vehicle identifier database 6181.

The image processing module 625 determines whether the captured images have provided any partial or complete read results for the license plate number and state of the target vehicle (block 913). If no partial or complete read results were provided by the captured images, process 900 proceeds to operation 941 of the manual identification process 940.

If partial or complete read results for the license plate number and state of the target vehicle were provided by the captured images, computer 612 searches the vehicle record database 6182 and read errors database 6183 for the exact (either partial or complete) license plate number (as read by the license plate reader) (block 921).

The vehicle record database 6182 includes records for all vehicles previously recognized and potentially includes records for vehicles that are anticipated to be seen. The vehicle record database 6182 is typically populated through a registration process during which a driver/owner of a vehicle signs the vehicle up for automated toll payment handling. The driver/owner of a vehicle may sign a vehicle up for automated toll payment handling by driving the vehicle through a special registration lane in the toll facility 628 and providing a customer service representative at the facility 628 with his or her identity and other contact information. The image acquisition module 624 and the image processing module 625 capture the license plate number, the fingerprint, and other identification/classification data (e.g., the vehicle dimensions) of the user's vehicle while the vehicle traverses the facility 628. The vehicle and owner identification data is stored in a new vehicle identification record associated with the newly registered vehicle and owner/driver.

Alternatively, a driver/owner may register a vehicle for automatic toll payment handling by simply driving through the facility 628, without stopping. The computer 612 captures image data and sensor data for the vehicle and attempts to identify the driver/owner by reading the license plate image and looking up the read results in a database of an external system 634 (e.g., vehicle registration authorities). If an owner/driver is identified, the computer 612 bills the owner/driver. Once a billing relationship has been successfully setup, the computer 612 officially registers the vehicle, generates as necessary the vehicle fingerprint data and other signature/classification data from the captured image and sensor data, and stores these in a vehicle identification record associated with the identified owner/driver.

In another implementation, the computer 612 is configured to obtain greater accuracy in identifying an unregistered driver/owner by looking up the license plate read results in a database of a vehicle registration authority (or other external system) and requesting a corresponding vehicle identification number (VIN) from the vehicle registration authority (or other external system). The computer 612 uses the VIN to determine the make, model, and year of the vehicle. The make, model, and year of the vehicle may be used to determine the length, width, and height of the vehicle. The computer 612 may then determine a successful match of the target vehicle with a vehicle registered with the vehicle registration authority not only by comparing license plate data but also by comparing vehicle dimensions (as captured, for example, in a laser signature and/or an inductive signature). Typically, the computer 612 will consider a match successful if the license plate read results for the target vehicle match the license plate data for the vehicle registered with the vehicle registration authority to within a predetermined threshold and the vehicle dimensions of both vehicles match within a given tolerance.

The make, model, and year of a vehicle may be used, for example, to determine the length, width, and height of the vehicle by either accessing this information from a public database or from a $3^{rd}$ party database or, additionally or alternatively, by accessing the vehicle records database 6182 to retrieve the length, width, and height data from one or more vehicle identification records corresponding to vehicles having the same make, model, and year as the target vehicle. Given that a vehicle's dimensions may change if the vehicle has been modified, the length, width, and height accessed from the vehicle identification records may vary by vehicle. Accordingly, the computer 612 may need to statistically determine the appropriate dimensions for comparison by, for example, taking the average or median length, width, and height dimensions.

In one implementation, the computer 612 identifies a vehicle in part through use of an electronic signature that includes a laser signature and/or an inductive (i.e., magnetic) signature. When a vehicle transacts with the toll system, an electronic signature is captured for the vehicle. The image and measurements of the vehicle created by the laser (i.e., the laser signature) and/or the magnetic scan (i.e., the inductive signature) are compared against known dimensions and images of vehicles based on vehicle identification number (VIN) that were, for example, previously captured by the toll system or by an external system. By comparing the electronic signature image and dimensions to known dimensions of vehicles based on VIN, the search for a matching vehicle and associated VIN may be narrowed. If, for example, an LPR for the vehicle has a low confidence level, but the electronic signature of the vehicle has been captured, the toll system may access a database, as described above, of known dimensions and images for vehicles and associated VINs and cross reference the electronic signature dimensions and images against the database to identify the matching vehicle VIN or identify potential matching vehicle candidates/VINs. The read errors database 6183 links previous incorrect read results to correct vehicle identification records. For example, when automated vehicle identification fails but manual vehicle identification succeeds, the captured vehicle identification data (e.g., the license plate read result) that led to an "error" (i.e., an identification failure) by the automated system is stored in an error record in the read errors database 6183 that is linked to the vehicle identification record that was manually identified for the vehicle. Thus, when the same vehicle identification data is captured again at a later date, the computer 612 may successfully identify the vehicle automatically by accessing the error record in the read errors database 6183, which identifies the correct vehicle identification record for the vehicle, without requiring another manual identification of the vehicle.

An error record also may be generated and stored in the read errors database 6183 when automated identification of the vehicle succeeds based on a near match of an incorrect license plate read result. For example, if the license plate number "ABC123" is read as "ABC128" and the identified candidate match set is "ABC128," "ABC123," "ABG128" and "ABC128" which in turn yields the correct match of "ABC123," an error record may be created that automatically links a license plate read result of "ABC128" to the vehicle having the license plate number "ABC123."

The computer 612 determines whether any vehicle identification records correspond to the license plate read results for the target vehicle (block 922). If no vehicle identification records correspond to the read results, the computer 612 performs an extended search (block 923).

The computer 612 performs an extended search by changing or loosening the criteria for a successful match or detuning the license plate read algorithm. For example, the computer 612 may perform an extended search by one or more of the following: (1) comparing a subset of the license plate number read result with the characters of the license plate numbers stored in the vehicle record database 6182 (e.g., the last two characters of the license plate number may be omitted such that if the license plate number is "ABC123," any vehicles having license plate numbers "ABC1**" are deemed matching candidates, wherein "*" is a variable); (2) comparing a subset of the license plate number read result in reverse order with the characters of the license plate numbers stored in the vehicle record database 6182 in reverse order (e.g., the last two characters of the license plate number in reverse order may be omitted such that if the license plate number is "ABC123", which is "321CBA" in reverse order, any vehicles having license plate numbers in reverse order of "321C**" are deemed matching candidates, wherein "*" is a variable); and (3) other near match techniques including comparing modified versions of the license plate read result and license plate numbers stored in the vehicle record database 6182 in which some of either or both are substituted and/or removed to reduce the impact of misread characters. For example, if the OCR algorithm does not indicate a confidence level above a predetermined threshold in a read result of a character on the license plate, that character may be ignored. Additionally or alternatively, if the OCR algorithm indicates that a character on the license plate may be one of two possible different characters, both alternative characters may be used in the extended search.

The computer 612 determines whether any vehicle identification records correspond to the read results for the target vehicle after performing the extended search (block 924). If no vehicle identification records are found, process 900 proceeds to operation 941 of the manual identification process 940 (block 924).

Referring to FIG. 9B, if either the search or the extended search lead to identification of one or more vehicle identification records, the computer 612 retrieves vehicle fingerprint and optionally other vehicle signature/classification data from the identified vehicle identification records (block 931). The computer 612 compares the retrieved vehicle fingerprint and optionally other vehicle signature/classification data for each matching vehicle candidate with the corresponding data associated with the target vehicle to identify one or more possible matches (block 932). The vehicle fingerprint comparison may be performed with a comparison algorithm identical or similar to the one developed by JAI-PULNiX Inc. of San Jose, Calif. and described in U.S. Pat. No. 6,747,687.

A possible match may be defined, for example, as a vehicle fingerprint match with a confidence score greater than or equal to a predefined threshold and all or some of the other classification/signature data falling within tolerances defined for each data type. For example, if the fingerprint matching algorithm generates a score of 1 to 1000, where 1 is no match and 1000 is a perfect match, then a score greater than or equal to 900 may be required for a successful match. Additionally, if the other classification/signature data includes target vehicle height, width, and length, then the height, width, and length of the vehicle candidate may be required to be within plus or minus four inches of the extracted height, width, and length of the target vehicle for a successful match. One or more vehicle identification records may be deemed to correspond to vehicles that possibly match the target vehicle.

The computer 612 determines whether a possible match is sufficient to automatically identify the vehicle without human intervention by determining a combined equivalent matching score for each possible match and comparing the result to a predetermined automated confidence threshold (block 933). The computer 612 may, for example, determine a combined equivalent matching score for each possible match in a manner similar to that described previously with respect to process 700. Specifically, the computer 612 may assign a match confidence level number to the fingerprint matching and, optionally, to the classification/signature data matching, assign a weight to each data type, and calculate a combined equivalent matching score by combining the weighted match confidence level numbers. If the combined equivalent matching score exceeds a predetermined automated confidence threshold, the computer 612 deems the target vehicle successfully identified and process 900 proceeds to operation 937 for recording the transaction event between the identified vehicle and the facility 628. If more than one possible match exceeds the automated confidence threshold, the automated identification process may be faulty, and process 900 may optionally proceed (not shown) to operation 941 of the manual identification process 940.

If no possible match is deemed sufficient to automatically identify the vehicle without human intervention, the computer 612 determines whether one or more possible matches satisfy a lower probable match threshold (block 934). The computer 612 may, for example, determine that a possible match satisfies the probable match threshold if the combined equivalent matching score of the possible match is higher than the probable match threshold but lower than the automated confidence threshold.

If at least one possible match satisfies the probable match threshold, the computer 612 enables an operator to perform visual match truthing (block 935). Visual match truthing is a process in which the computer 612 presents one or more of the images of the target vehicle to the operator along with one or more of the reference images associated with the vehicle or vehicles that probably match the target vehicle. The operator quickly confirms or rejects each probable match with a simple yes or no indication by, for example, selecting the appropriate buttons on a user interface (block 936). The operator also may optionally provide a detailed explanation to support his or her response.

If the match exceeds the automated confidence threshold or is visually confirmed by the operator through visual match truthing, the computer 612 creates a record of the event (i.e., a record of the interaction between the positively identified target vehicle and the facility 628) as, for example, a billable or non-revenue transaction (block 937). If the match was confirmed through visual match truthing, the computer 612 may optionally update the read errors database 6183 to include the extracted vehicle identification data and a link that associates the extracted vehicle identification data with the correct vehicle identification record (block 938).

Referring also to FIG. 9C, the computer 612 is configured to enable an operator to manually identify the target vehicle (block 941) under the following circumstances: (1) the captured images of the target vehicle do not provide any partial or complete read results for the license plate number and state of the target vehicle (block 913); (2) no vehicle identification records are found that correspond to the license plate read results for the target vehicle after performing an extended search (block 924); (3) one or more possible matches are found but the confidence level in the one or more possible matches, as reflected by combined equivalent matching scores, fall below both the automated confidence threshold and the probable match threshold (block 934); and (4) one or more probable matches are found but a human operator rejects the one or more probable matches through visual match truthing (block 936).

The human operator attempts to manually identify the vehicle by (1) reading the license plate(s), and (2) observing vehicle details captured by the image acquisition module 624, and (3) comparing the license plate data and vehicle details with data available from the vehicle records database 6182, read errors database 6183, and/or databases of external systems 634. License plates read by a human operator may be confirmed by comparison with automated license plate reader results and/or multiple entry by multiple human operators.

The manual identification may be deemed successful if the manually collected data, weighed against definable criteria for a positive vehicle match, exceeds a predetermined identification confidence threshold (block 942). This determination may be done by the computer 612, the operator that provided the manual data, and/or a more qualified operator.

In one implementation, if a vehicle cannot be positively identified automatically and no near matches are found, one or more images of the vehicle are displayed to a first human reviewer. The first human reviewer inspects the images and manually specifies the license plate number that the first reviewer believes corresponds to the vehicle based on the images. Because this manual review by the first human reviewer is also subject to error (e.g., perceptual or typographical error), the license plate read by the first human reviewer is compared to an LPR database to determine whether the license plate number specified by the first human reviewer exists. Additionally, if a database record having fingerprint data corresponding to the license plate read exists, a fingerprint comparison also may be performed. If the first human reviewer read result does not match any known LPR result or vehicle, the one or more images of the vehicle may be displayed to a second human reviewer. The second human reviewer inspects the images and manually specifies the license plate number that the second human reviewer believes corresponds to the vehicle based on the images. If the read result by the second human reviewer is different than the read result by the first human reviewer, a read by a third human reviewer, who is typically a more qualified reviewer, may be necessary. In sum, the first human reviewer read is effectively a jumping off point to re-attempt an automated match. If the automated match still fails, multiple human reviewers must show agreement in reading the license plate for the read to be deemed accurate.

If the vehicle is not successfully identified, the computer 612 creates a record of the event as an unidentified or unassigned transaction (block 943). If the vehicle is successfully identified, the computer 612 creates a record of the event as, for example, a billable or non-revenue transaction (block 937). If the vehicle had never been previously identified, the computer 612 may create a new vehicle identification record for the vehicle and its owner/driver in the vehicle record database 6182. The computer 612 also may update the read errors database 6183 to include the extracted vehicle identification data and a link that associates the extracted vehicle identification data with the correct vehicle identification record (block 938).

The above applications represent illustrative examples and the disclosed techniques disclosed can be employed in other applications. Further, the various aspects and disclosed techniques (including systems and processes) can be modified, combined in whole or in part with each other, supplemented, or deleted to produce additional implementations.

The systems and techniques described here can be implemented in digital electronic circuitry, or in computer hardware, firmware, software, or in combinations of them. The systems and techniques described here can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the systems and techniques described here can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The typical elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the systems and techniques described here can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other implementations are within the scope of the following claims.

What is claimed is:

1. A computer-implemented method of identifying a vehicle in a toll system, the method comprising:
    accessing image data for a vehicle transacting with a toll system;
    obtaining first vehicle identifier data from the accessed image data for the transacting vehicle;
    accessing a set of records that includes first vehicle identifier data for vehicles;
    executing, using at least one processing device, an algorithm to:
        compare the first vehicle identifier data for the transacting vehicle with the first vehicle identifier data for vehicles in the set of records, and
        identify a set of vehicle candidates from the vehicles having records in the set of records, wherein the identified set of vehicle candidates excludes at least one vehicle having a record in the set of records; and
    selecting, from the set of vehicle candidates, a vehicle candidate as corresponding to the transacting vehicle by:
        accessing second vehicle identifier data for the transacting vehicle, the second vehicle identifier data being data for identifying a vehicle that is distinct from first vehicle identifier data,
        accessing second vehicle identifier data for a vehicle candidate in the set of vehicle candidates,
        comparing, using the at least one processing device, the second vehicle identifier data for the transacting vehicle with the second vehicle identifier data for the vehicle candidate in the set of vehicle candidates, and
        identifying the vehicle candidate in the set of vehicle candidates as the transacting vehicle based on results of the comparison of second vehicle identifier data,
    wherein executing the algorithm to compare the first vehicle identifier data for the transacting vehicle with the first vehicle identifier data for vehicles in the set of records includes:
        searching a vehicle record database for records that include first vehicle identifier data that exactly match the first vehicle identifier data obtained for the transacting vehicle, and
        performing an extended search of the vehicle record database for records that include first vehicle identifier data that nearly match the first vehicle identifier data obtained for the transacting vehicle, the extended search being conditioned on no vehicle identification records being found that include first vehicle identifier data that exactly match the first vehicle identifier data obtained for the transacting vehicle.

2. The method of claim 1,
    wherein comparing the first vehicle identifier data for the transacting vehicle with the first vehicle identifier data for vehicles in the set of records includes comparing the first vehicle identifier data using predetermined matching criteria, and
    further comprising changing the predetermined matching criteria to increase the number of vehicles in the identified set of vehicles.

3. The method of claim 2, wherein changing the predetermined matching criteria to increase the number of vehicles in the identified set of vehicles is conditioned on a failure to identify any vehicles in the set of vehicles as the transacting vehicle based on results of the comparison of second vehicle identifier data.

4. The method of claim 1,
    further comprising accessing laser signature data,
    wherein the laser signature data comprises data obtained by using a laser to scan the transacting vehicle.

5. The method of claim 4, wherein the laser signature data includes one or more of an overhead electronic profile of the transacting vehicle, an axle count of the transacting vehicle, and a 3D image of the transacting vehicle.

6. The method of claim 4,
    further comprising comparing laser signature data for the transacting vehicle with laser signature data for vehicles in the set of records, and
    wherein identifying a set of vehicles from the vehicles having records in the set of records includes identifying the set of vehicles based on the results of the comparison of the first vehicle identifier data and the results of the comparison of the laser signature data.

7. The method of claim 1,
    further comprising accessing inductive signature data,
    wherein the inductive signature data comprises data obtained through use of a loop array over which the transacting vehicle passes.

8. The method of claim 7, wherein the inductive signature data includes one or more of an axle count of the transacting vehicle, a type of engine of the transacting vehicle, and a vehicle type or class for the transacting vehicle.

9. The method of claim 7,
    further comprising comparing laser signature data for the transacting vehicle with laser signature data for vehicles in the set of records, and
    wherein identifying a set of vehicles from the vehicles having records in the set of records includes identifying the set of vehicles based on the results of the comparison of the first vehicle identifier data and the results of the comparison of the inductive signature data.

10. The method of claim 1, wherein identifying the vehicle candidate in the set of vehicle candidates as the transacting vehicle includes identifying the vehicle candidate as the transacting vehicle if the comparison of the second vehicle identifier data for the transacting vehicle with the second vehicle identifier data for the vehicle candidate in the set of vehicle candidates indicates a match having a confidence level that exceeds a confidence threshold.

11. The method of claim 10, wherein identifying the vehicle candidate in the set of vehicle candidates as the transacting vehicle includes identifying the vehicle candidate in the set of vehicle candidates as the transacting vehicle without human intervention if the confidence level of the match exceeds a first confidence threshold.

12. The method of claim 11, wherein identifying the vehicle candidate in the set of vehicle candidates as the transacting vehicle includes identifying the vehicle candidate in the set of vehicle candidates as the transacting vehicle if the confidence level of the match is less than the first confidence threshold but greater than a second confidence threshold and a human operator confirms the match.

13. The method of claim 12, further comprising enabling the human operator to confirm or reject the match by:
enabling the human operator to perceive the accessed image data for the transacting vehicle,
enabling the human operator to perceive one or more reference images associated with the vehicle candidate, and
enabling the human operator to interact with a user interface to indicate rejection or confirmation of the match.

14. The method of claim 12, wherein identifying the vehicle candidate in the set of vehicle candidates as the transacting vehicle includes identifying the vehicle candidate as the transacting vehicle if the confidence level of the match is less than the first and second confidence thresholds and a human operator manually identifies the vehicle candidate as the transacting vehicle by accessing the image data for the transacting vehicle and the record for the vehicle candidate in the set of records.

15. The method of claim 1, wherein identifying the vehicle candidate in the set of vehicle candidates as the transacting vehicle includes identifying the vehicle candidate based on vehicle identification number (VIN), laser signature, inductive signature, and image data.

16. The method of claim 1, wherein the second vehicle identifier comprises vehicle fingerprint data for the transacting vehicle, the vehicle fingerprint data for the transacting vehicle being based on the accessed image data for the transacting vehicle.

17. An apparatus for identifying a vehicle in a toll system, the apparatus comprising:
an image capture device configured to capture image data for a vehicle transacting with a toll system; and
one or more processing devices communicatively coupled to each other and to the image capture device and configured to:
access the image data for the transacting vehicle;
obtain first vehicle identifier data from the accessed image data for the transacting vehicle;
access a set of records that includes first vehicle identifier data for vehicles;
execute an algorithm to:
compare the first vehicle identifier data for the transacting vehicle with the first vehicle identifier data for vehicles in the set of records, and
identify a set of vehicle candidates from the vehicles having records in the set of records, wherein the identified set of vehicle candidates excludes at least one vehicle having a record in the set of records; and
select, from the set of vehicle candidates, a vehicle candidate as corresponding to the transacting vehicle by:
accessing second vehicle identifier data for the transacting vehicle, the second vehicle identifier data being data for identifying a vehicle that is distinct from first vehicle identifier data,
accessing second vehicle identifier data for a vehicle candidate in the set of vehicle candidates,
comparing the second vehicle identifier data for the transacting vehicle with the second vehicle identifier data for the vehicle candidate in the set of vehicle candidates, and
identifying the vehicle candidate in the set of vehicle candidates as the transacting vehicle based on results of the comparison of second vehicle identifier data,
wherein the one or more processing devices being configured to execute an algorithm to compare the first vehicle identifier data for the transacting vehicle with the first vehicle identifier data for vehicles in the set of records comprises the one or more processing devices being configured to:
search a vehicle record database for records that include first vehicle identifier data that exactly match the first vehicle identifier data obtained for the transacting vehicle, and
perform an extended search of the vehicle record database for records that include first vehicle identifier data that nearly match the first vehicle identifier data obtained for the transacting vehicle, the extended search being conditioned on no vehicle identification records being found that include first vehicle identifier data that exactly match the first vehicle identifier data obtained for the transacting vehicle.

18. A computer-readable storage device storing software comprising instructions executable by one or more computers which, upon such execution, cause the one or more computers to perform operations comprising:
accessing image data captured by an image capture device, the image data corresponding to a vehicle transacting with a toll system;
obtaining first vehicle identifier data from the accessed image data for the transacting vehicle;
accessing a set of records that includes first vehicle identifier data for vehicles;
executing an algorithm to:
compare the first vehicle identifier data for the transacting vehicle with the first vehicle identifier data for vehicles in the set of records, and
identify a set of vehicle candidates from the vehicles having records in the set of records, wherein the identified set of vehicle candidates excludes at least one vehicle having a record in the set of records; and
selecting, from the set of vehicle candidates, a vehicle candidate as corresponding to the transacting vehicle by:
accessing second vehicle identifier data for the transacting vehicle, the second vehicle identifier data being data for identifying a vehicle that is distinct from first vehicle identifier data,
accessing second vehicle identifier data for a vehicle candidate in the set of vehicle candidates, comparing the second vehicle identifier data for the transacting vehicle with the second vehicle identifier data for the vehicle candidate in the set of vehicle candidates, and identifying the vehicle candidate in the set of vehicle candidates as the transacting vehicle based on results of the comparison of second vehicle identifier data, wherein executing the algorithm to compare the first vehicle identifier data for the transacting vehicle with the first vehicle identifier data for vehicles in the set of records includes:

searching a vehicle record database for records that include first vehicle identifier data that exactly match the first vehicle identifier data obtained for the transacting vehicle, and performing an extended search of the vehicle record database for records that include first vehicle identifier data that nearly match the first vehicle identifier data obtained for the transacting vehicle, the extended search being conditioned on no vehicle identification records being found that include first vehicle identifier data that exactly match the first vehicle identifier data obtained for the transacting vehicle.

\* \* \* \* \*